US007912773B1

(12) United States Patent
Subramanian et al.

(10) Patent No.: US 7,912,773 B1
(45) Date of Patent: Mar. 22, 2011

(54) COMPUTER-IMPLEMENTED DATA STORAGE SYSTEMS AND METHODS FOR USE WITH PREDICTIVE MODEL SYSTEMS

(75) Inventors: Revathi Subramanian, San Diego, CA (US); Radu Drossu, San Diego, CA (US); Kevin Chaowen Chen, San Diego, CA (US); Paul C. Dulany, San Diego, CA (US)

(73) Assignee: SAS Institute Inc., Cary, NC (US)

( * ) Notice: Subject to any disclaimer, the term of this patent is extended or adjusted under 35 U.S.C. 154(b) by 501 days.

(21) Appl. No.: 11/691,277

(22) Filed: Mar. 26, 2007

Related U.S. Application Data

(60) Provisional application No. 60/786,038, filed on Mar. 24, 2006.

(51) Int. Cl.
G06Q 40/00 (2006.01)
(52) U.S. Cl. ........................................................ 705/35
(58) Field of Classification Search ............ 375/E7.199, 375/240, 240.12; 235/375, 379; 706/47; 705/35, 39, 43, 44, 75; 707/200
See application file for complete search history.

(56) References Cited

U.S. PATENT DOCUMENTS

| 5,335,291 A | 8/1994 | Kramer et al. |
| 5,519,319 A | 5/1996 | Smith et al. |
| 5,650,722 A | 7/1997 | Smith et al. |
| 5,675,253 A | 10/1997 | Smith et al. |
| 5,677,955 A | 10/1997 | Doggett et al. |
| 5,761,442 A | 6/1998 | Barr et al. |
| 5,819,226 A * | 10/1998 | Gopinathan et al. ............ 705/44 |
| 5,884,289 A * | 3/1999 | Anderson et al. ............... 705/44 |
| 6,029,154 A | 2/2000 | Pettitt |
| 6,047,268 A | 4/2000 | Bartoli et al. |
| 6,064,990 A | 5/2000 | Goldsmith |
| 6,122,624 A | 9/2000 | Tetro et al. |
| 6,125,349 A | 9/2000 | Maher |
| 6,170,744 B1 | 1/2001 | Lee et al. |
| 6,330,546 B1 | 12/2001 | Gopinathan et al. |
| 6,360,326 B1 * | 3/2002 | Hiles .............................. 726/19 |
| 6,388,592 B1 * | 5/2002 | Natarajan ..................... 341/107 |
| 6,401,198 B1 * | 6/2002 | Harmer et al. ..................... 713/1 |
| 6,453,206 B1 | 9/2002 | Soraghan et al. |
| 6,516,056 B1 | 2/2003 | Justice et al. |
| 6,549,861 B1 | 4/2003 | Mark et al. |
| 6,601,049 B1 | 7/2003 | Cooper |
| 6,631,212 B1 | 10/2003 | Luo et al. |
| 6,650,779 B2 | 11/2003 | Vachtesvanos et al. |

(Continued)

OTHER PUBLICATIONS

Hinterseer, K. "The Wolfsberg Anti-money Laundering Principles." Journal of Money Laundering Control. v5 (1); Summer 2001; pp. 25-41.*

(Continued)

*Primary Examiner* — James A Kramer
*Assistant Examiner* — Martin A Gottschalk
(74) *Attorney, Agent, or Firm* — Jones Day

(57) ABSTRACT

Systems and methods for performing fraud detection. As an example, a system and method can be configured to contain a raw data repository for storing raw data related to financial transactions. A data store contains rules to indicate how many generations or to indicate a time period within which data items are to be stored in the raw data repository. Data items stored in the raw data repository are then accessed by a predictive model in order to perform fraud detection.

25 Claims, 34 Drawing Sheets

U.S. PATENT DOCUMENTS

| | | | |
|---|---|---|---|
| 6,675,145 | B1 | 1/2004 | Yehia et al. |
| 6,678,640 | B2 | 1/2004 | Ishida et al. |
| 6,901,398 | B1 * | 5/2005 | Horvitz et al. ............... 709/207 |
| 7,117,191 | B2 | 10/2006 | Gavan et al. |
| 7,191,150 | B1 | 3/2007 | Shao et al. |
| 7,269,516 | B2 | 9/2007 | Brunner et al. |
| 7,403,922 | B1 | 7/2008 | Lewis et al. |
| 7,455,226 | B1 | 11/2008 | Hammond et al. |
| 7,461,048 | B2 | 12/2008 | Teverovskiy et al. |
| 7,467,119 | B2 | 12/2008 | Saidi et al. |
| 7,480,640 | B1 | 1/2009 | Elad et al. |
| 7,536,348 | B2 | 5/2009 | Shao et al. |
| 7,562,058 | B2 | 7/2009 | Pinto et al. |
| 7,580,798 | B2 | 8/2009 | Brunner et al. |
| 2001/0056379 | A1 * | 12/2001 | Fujinaga et al. ............... 705/26 |
| 2002/0138417 | A1 | 9/2002 | Lawrence |
| 2002/0194119 | A1 | 12/2002 | Wright et al. |
| 2003/0093366 | A1 | 5/2003 | Halper et al. |
| 2003/0097330 | A1 | 5/2003 | Hillmer et al. |
| 2004/0039688 | A1 | 2/2004 | Sulkowski et al. |
| 2005/0055373 | A1 | 3/2005 | Forman |
| 2005/0131873 | A1 * | 6/2005 | Fan et al. ............... 707/3 |
| 2005/0222928 | A1 * | 10/2005 | Steier et al. ............... 705/35 |
| 2006/0020814 | A1 | 1/2006 | Lieblich et al. |
| 2006/0181411 | A1 | 8/2006 | Fast et al. |
| 2006/0218169 | A1 * | 9/2006 | Steinberg et al. ............... 707/101 |
| 2007/0038567 | A1 * | 2/2007 | Allaire et al. ............... 705/50 |
| 2007/0192167 | A1 | 8/2007 | Lei et al. |
| 2007/0219817 | A1 * | 9/2007 | Wu ............... 705/1 |
| 2007/0239606 | A1 * | 10/2007 | Eisen ............... 705/51 |
| 2008/0134236 | A1 | 6/2008 | Iijima et al. |

OTHER PUBLICATIONS

Miyazaki, A.D., and Fernandez, A. "Internet Privacy and Security: An Examination of Online Retailer Disclosures." Journal of Public Policy & Marketing. v19 (1); Spring 2000; pp. 54-61.*

Brause, Rudiger W., "Cascaded Vector Quantization by Non-Linear PCA Network Layers", IEEE, pp. 154-160 (1994).

Chan, Lipchen Alex et al., "Automatic target detection using dualband infrared imager", Acoustics, Speech, and Signal PICASSP'00. Proceedings, 2000 IEEE International Conference, pp. 2286-2289 (Jun. 9, 2000).

Chatterjee, Chanchal et al., "Self-Organizing Algorithms for Generalized Eigen-Decomposition", IEEE Transactions on Neural Networks, vol. 8, No. 6, pp. 1518-1530 (Nov. 1997).

Chen, Yupeng et al., "High Resolution Adaptive Bearing Estimation Using a Complex-Weighted Neural Network", IEEE, 0-7803-0532-9/92, pp. II-317-IIII-320 (1992).

Mehrotra, Kishan et al., "Elements of Artificial Neural Networks", MIT Press, pp. 11, 25, 71 76, 85-87, 157, 170-171 (1997).

Wong, A.S.Y. et al., "A Unified Sequential Method for PCA", IEEE, pp. 583-586 (1999).

Tsai, Chieh-Yuan, et al., "A Dynamic Web Service based Data Mining Process System", Proceedings of the 2005 The Fifth International Conference on Computer and Information Technology, pp. 1033-1039 (2005).

Zhang, Tiezhu et al., "Study on the Application of Dynamic Balanced Scorecard in the Service Industry", 2008 International Conference on Intelligent Computation Technology and Automation, Digital Object Identifier: 10.1109/ICICTA.2008.359, pp. 1158-1162 (2008).

* cited by examiner

COMPUTER-IMPLEMENTED DATA STORAGE SYSTEMS AND METHODS FOR USE WITH PREDICTIVE MODEL SYSTEMS

CROSS-REFERENCE TO RELATED APPLICATIONS

This application claims priority to and the benefit of U.S. Provisional Application Ser. No. 60/786,038 (entitled "Computer-Implemented Data Storage For Predictive Model Systems" and filed on Mar. 24, 2006), of which the entire disclosure (including any and all figures) is incorporated herein by reference.

This application contains subject matter that may be considered related to subject matter disclosed in U.S. Provisional Application Ser. No. 60/786,039 (entitled "Computer-Implemented Predictive Model Generation Systems And Methods" and filed on Mar. 24, 2006), and to U.S. Provisional Application Ser. No. 60/786,040 (entitled "Computer-Implemented Predictive Model Scoring Systems And Methods" and filed on Mar. 24, 2006), of which the entire disclosures (including any and all figures) of these applications are incorporated herein by reference.

TECHNICAL FIELD

This document relates generally to computer predictive models and more particularly to constructing and using computer predictive models.

BACKGROUND

Computer predictive models have been used for many years in a diverse number of areas, such as in the financial industry. However current methods have difficulty in providing an automated or semi-automated mechanism for determining whether a suspicious activity, such as credit card fraud, may have occurred. As an illustration, previous systems experience problems in generating fraud indicative scores because such systems generally store aggregated/derived data and not raw data, thereby losing relevant history associated with an entity to perform scoring. Moreover, aggregated/derived data is specifically suited for a particular application and purpose (e.g., a fraud scoring purpose), but lacks flexibility to readily be used by other types of scoring applications.

SUMMARY

In accordance with the teachings provided herein, systems and methods for operation upon data processing devices are provided for performing fraud detection. As an example, a system and method can be configured to contain a raw data repository for storing raw data related to financial transactions. A data store contains rules to indicate how many generations or a time period within which data items are to be stored in the raw data repository. Data items stored in the raw data repository are then accessed by a predictive model in order to perform fraud detection.

DETAILED DESCRIPTION

Figure 1:
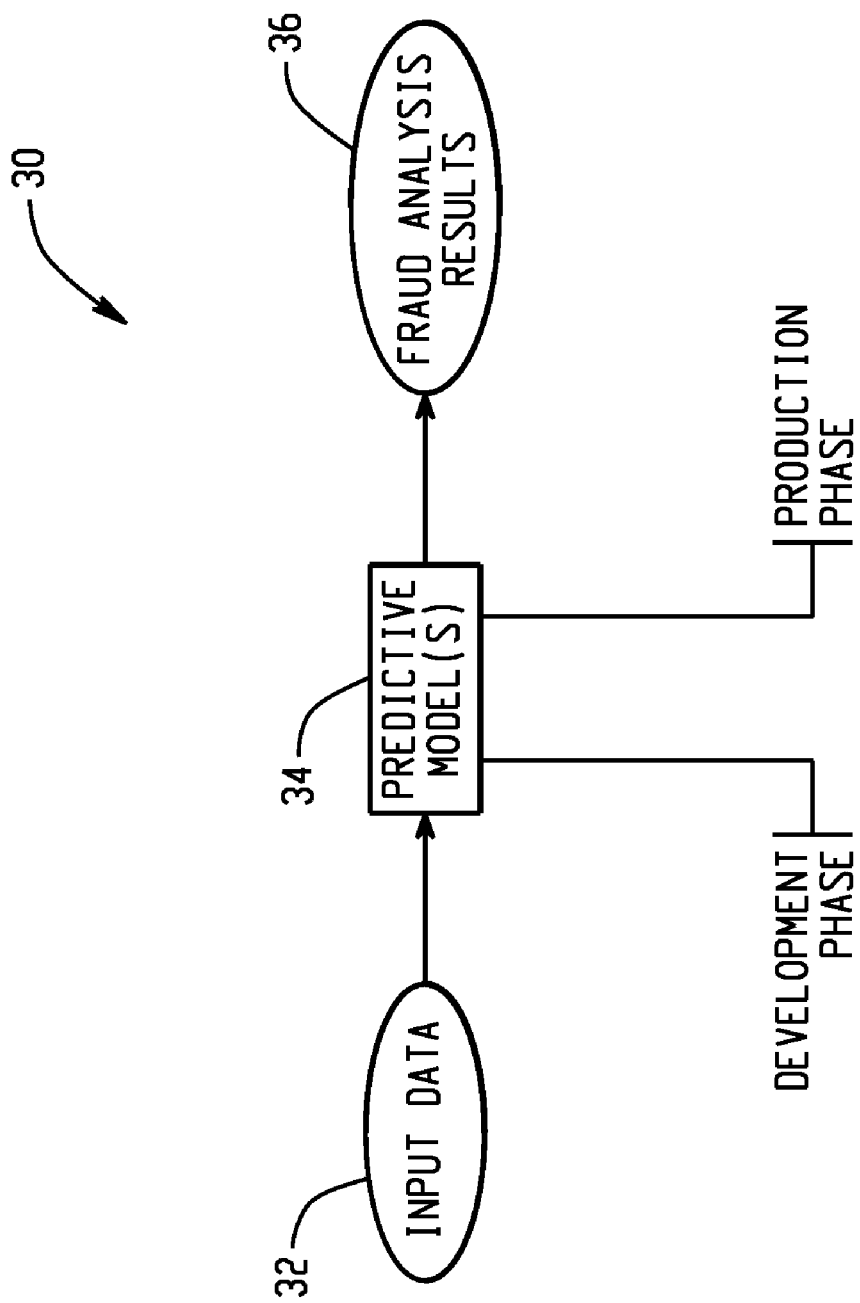
FIG. 1 is a block diagram depicting a computer-implemented system for generating and using predictive models to assess whether fraudulent activity may have occurred.

FIG. 1 depicts at 30 a computer-implemented system for generating and using predictive models 34 to assess whether fraudulent activity may have occurred. Accurate detection of fraud is important in that it results in action being taken earlier and in a more effective manner for addressing the fraudulent activity. An action could include for example whether a credit card company should personally investigate if fraud may have occurred with respect to a particular credit card holder. It should also be understood that the system 30 can be configured to process one entity or many entities.

As shown in FIG. 1, input data 32 is used during a development phase to create/train one or more predictive models 34. The predictive models 34 are then used during a production phase to receive input 32, such as from a financial institution, to generate fraud analysis results 36.

Figure 2:
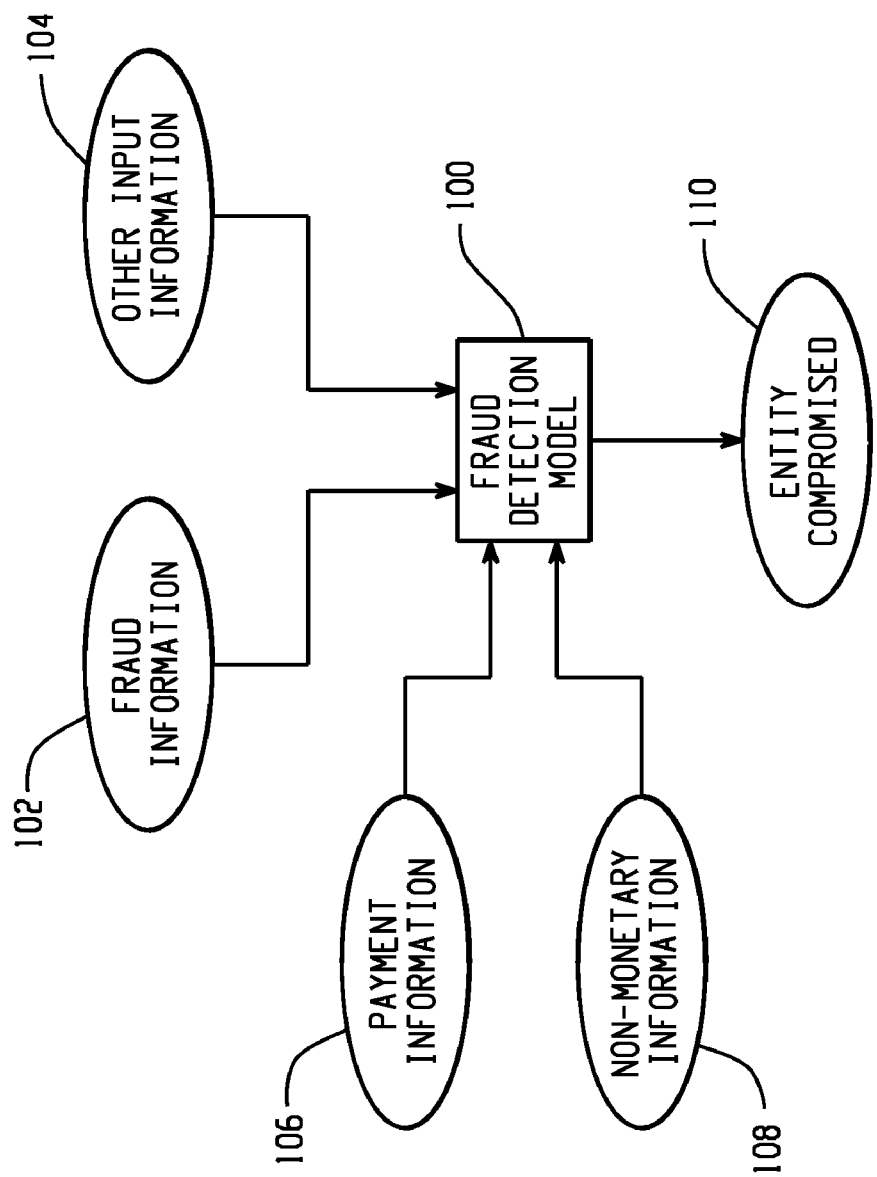
FIG. 2 is a block diagram depicting examples of input data.

Whether in the development phase or in the production phase, the input data 32 can be of many different types. Examples of such input data 32 are shown in FIG. 2. With reference to FIG. 2, a fraud detection model 100 can receive fraud information 102 and other input information 104, such as posting/transaction information, authorization information, cycle cut information, etc.

An example of fraud data could be the date of the first fraud as reported by a customer. For example, a customer may call a financial institution to indicate that one or more transactions that appeared on their credit card statement and represent a fraudulent use. An example of fraud is when a person steals a credit card number and uses it to purchase items.

The input fraud data can include several dates, such as the date on which fraud was first suspected to have occurred and a block date which is the date on which no further transactions should be authorized. A predictive model 100 can be trained to detect fraud (e.g., whether an entity has been compromised as shown at 110) within this account compromise period as early as possible.

Figure 3:
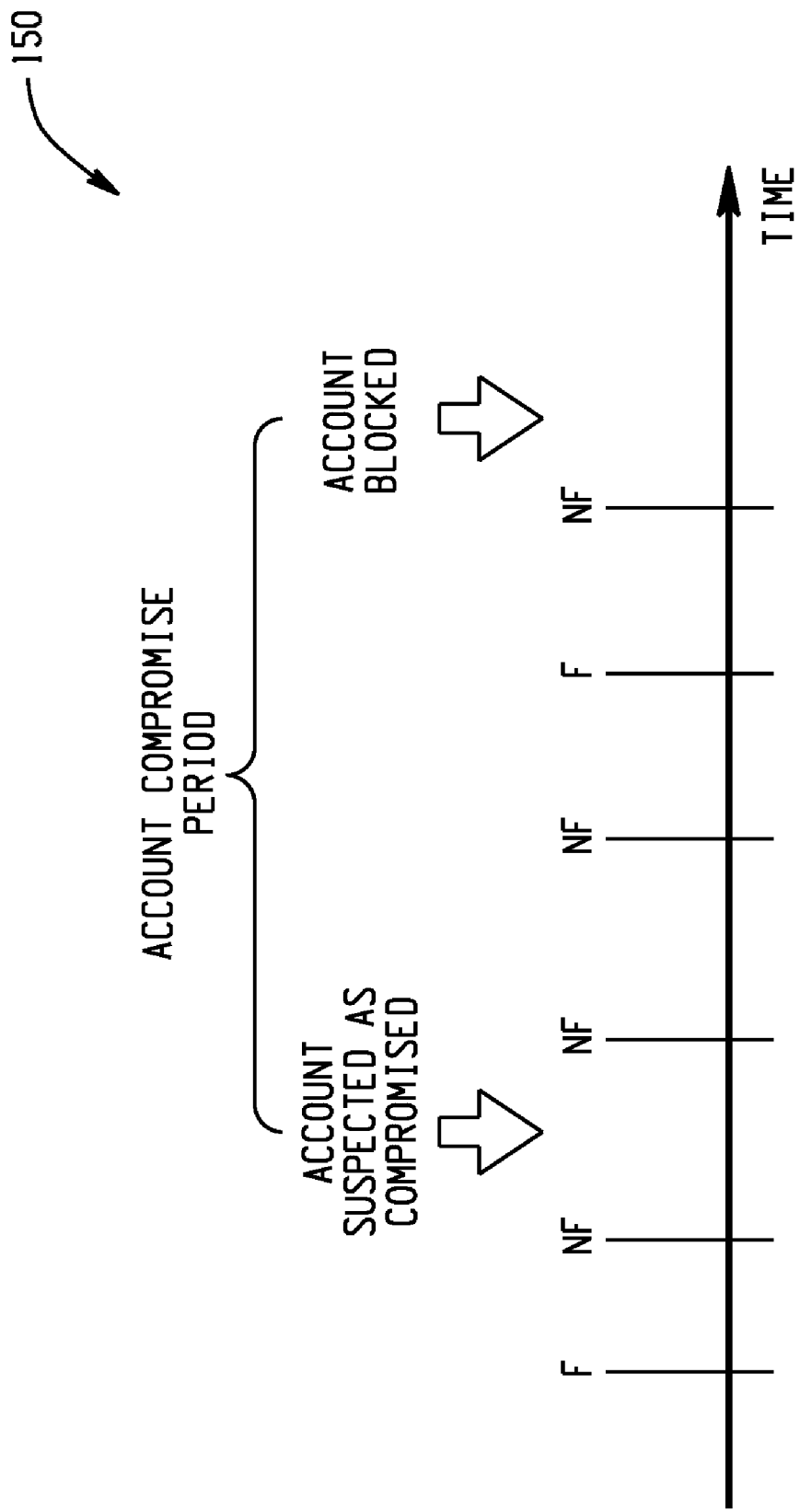
FIG. 3 is a graph showing an account compromise period.

The fraud data can be one record per account or multiple records per account. For example and as illustrated at 150 in FIG. 3, the data could have one record for each compromised account that identifies the beginning of the compromised period and the end of the compromised period. The compromised period may include both fraudulent as well as non-fraudulent transactions. This mixture is acceptable because the predictive model is trained not to detect fraud for a particular transaction, but whether an account should be deemed as having been compromised. Account-level fraud detection is a preferred approach over a transaction-based system because most financial institutions are more interested in whether an account has been compromised in order to stop the "bleeding" (e.g., reduce the amount of fraud) and not whether a particular transaction is fraudulent or not.

With reference back to FIG. 2, the system can also utilize payment information 106 and/or non-monetary information 108 to detect whether the account is in a fraud state. An example of payment information is the credit card payment information received on a monthly or other periodic basis. An example of non-monetary data is an address change, phone change, mother name change, or credit line change. Still further, another data feed could be postings. Postings are the process for the recording of debits and credits to individual cardholder account balances.

Figure 4:
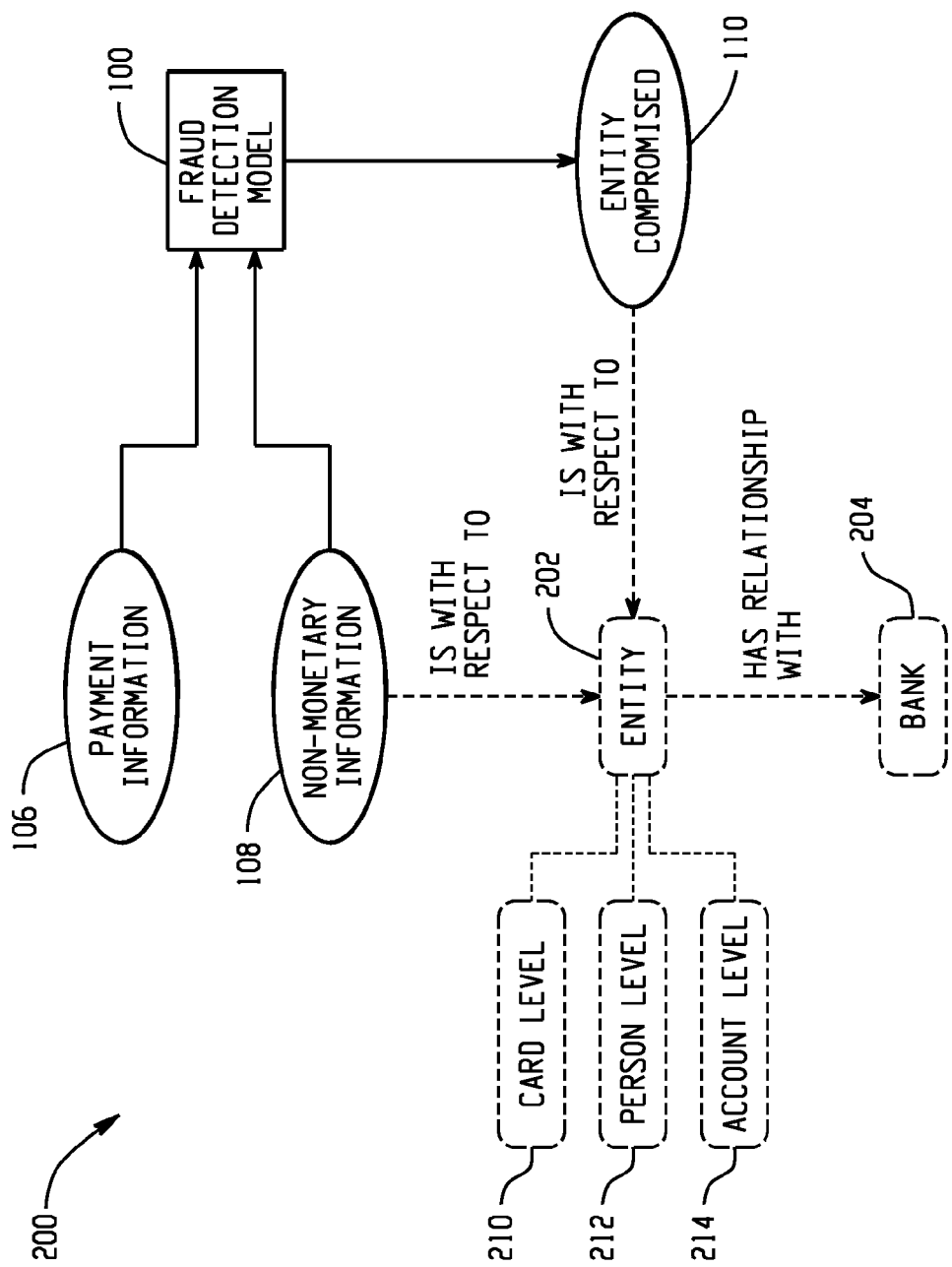
FIG. 4 is a block diagram depicting use of non-monetary information.

As illustrated at 200 in FIG. 4, non-monetary information 108 is provided regarding an entity 202 that has a relationship with a financial institution such as a bank 204. The entity 202 itself can be at different levels. These levels could be but are not limited to the card level 210, customer level 212, or account level 214. Using such information, the fraud detection process determines whether the entity 202 has been compromised (e.g., whether fraud has been detected).

Figure 5:
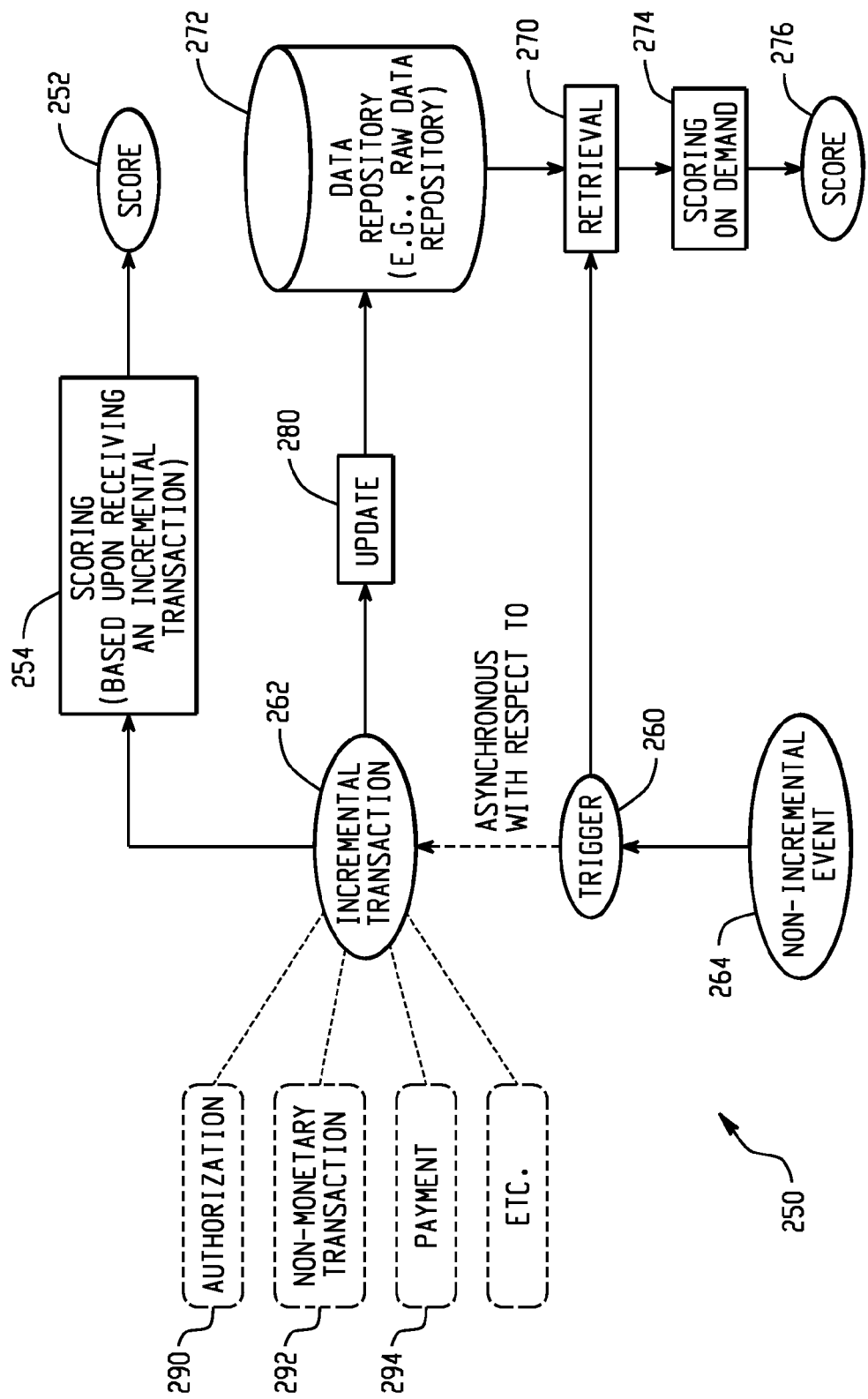
FIG. 5 is a block diagram depicting a system being configured to produce a score even in the absence of a current or new transaction on the account.

FIG. 5 depicts at 250 that a system can be configured to produce a score 276 even in the absence of a current or new transaction on the account (e.g., independent of whether a transaction-type event has occurred), which is an aid in the efficient use of resources to manage fraud cases. This is in contrast to most of today's fraud detection systems which only produce a score when a transaction (typically authorization) comes through the system. This is not particularly useful for managing case queues efficiently, when the fact that no additional transaction occurred during a certain time period could represent additional information that would be very useful in actively managing fraud.

Figure 6:
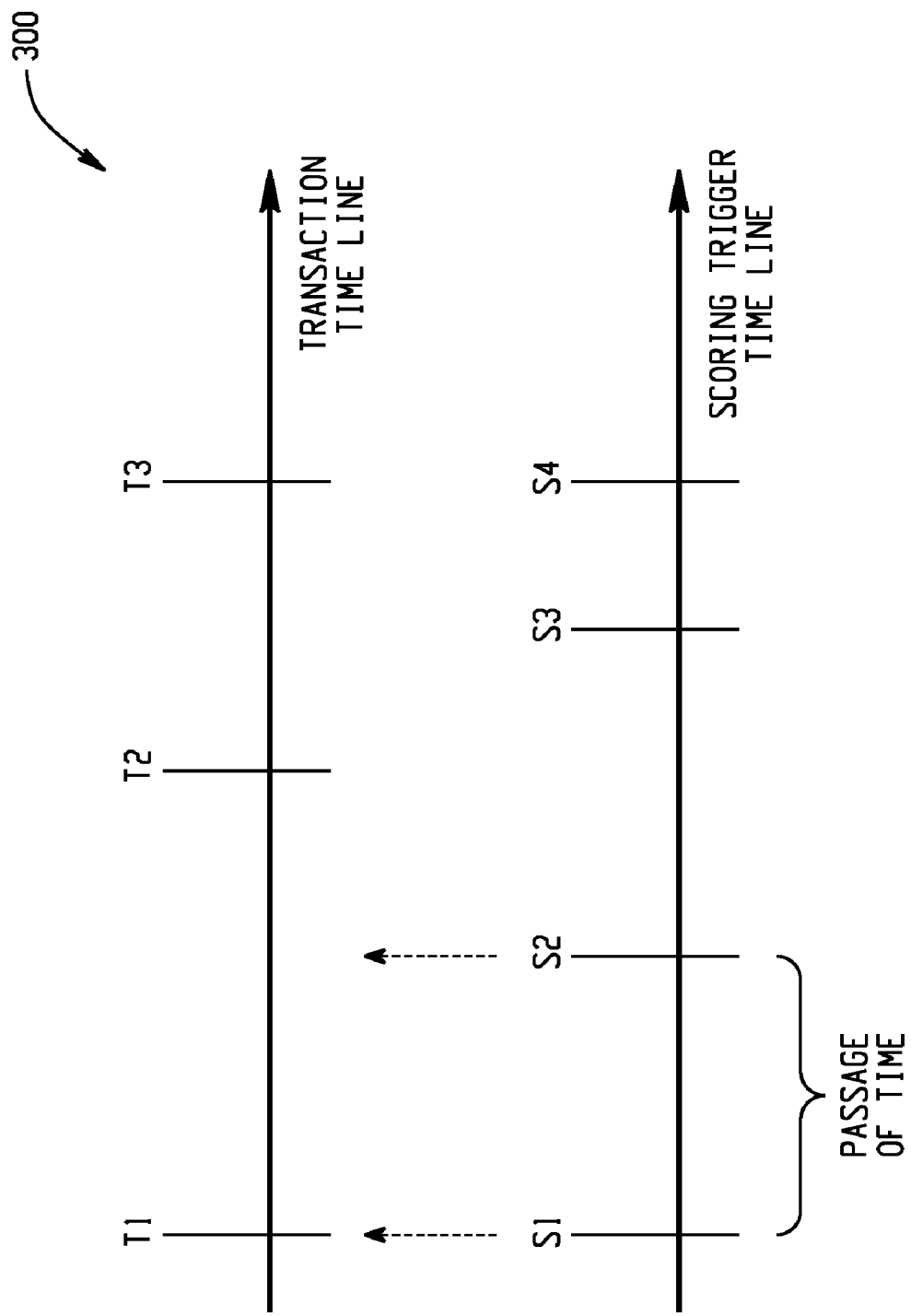
FIGS. 6 and 7 are time line graphs showing a transaction time line and a scoring trigger time line.

However, the system can also be configured such that at any time the system can generate via process 254 a fraud score 252. This includes generating a score 252 based upon receiving an incremental transaction 262. This account-level score indicates whether an account is in a compromised state or not. FIG. 6 illustrates at 300 that with scoring on demand, a different score (e.g., at "S2") might be produced even though only the passage of time had occurred with no new transactional information being received (e.g., "S2" was generated despite a new transaction "T2" not occurring until later).

With reference back to FIG. 5, the trigger 260 is asynchronous with respect to an incremental transaction 262 (e.g., an authorization transaction 290, non-monetary transaction 292, payment transaction 294, etc.). Generated in response to a non-incremental type event 264, a trigger 260 provides an indicator that records should be retrieved in process 270 from a repository 272. The records are to be generated for scoring process 274 for determining a score 276 as to whether an entity (e.g., an account) has been compromised. The records can be "raw" data (e.g., the actual transaction data received over time) from which features can be derived on-the-fly for use by the predictive model. However it should be understood that the retrieved records could also include derived data.

The repository 272 is updated via process 280 with every transaction, but a score-on-demand trigger 260 for deriving features is independent of receipt of an incremental transaction 262 and instead is dependent upon receipt of non-incremental information, such as date and time information. Account information is provided in order to specify which account should be scored. Date and time infoimation is provided because just the passage of time may result in a different score. The date and time information can be provided as part of the input by the requestor or can be obtained by other means, such as from a computer system clock. It should be understood that similar to the other processing flows described herein, the steps and the order of the processing steps described herein may be altered, modified and/or augmented and still achieve the desired outcome.

Different types of triggers may be involved in generating a score on demand, such as the process being triggered via a time/random trigger or a client event. An example of a time trigger would be to score one or more accounts at a periodic interval (e.g., every 48 hours) irrespective of whether an incremental transaction has occurred. A random trigger may also be used to randomly detect whether fraud has occurred with respect to one or more accounts.

For example the score for an account may be 900 but after only a passage of time and with no new transactions, the system might generate a different score such as 723. Such a situation might arise if a legitimate but highly suspicious transaction occurred. Since no transaction occurred over a period of time this lowers the likelihood of the account being in a compromised state. Previous systems would have problems in generating scores that are asynchronous with respect to a transaction occurrence because they generally store aggregated/derived data and not raw data and thus they lose relevant history associated with an account to perform asynchronous scoring. In previous systems, the aggregated/derived data is specifically suited for the scoring application and thus lacks flexibility to readily perform other types of scoring beyond its immediate purpose.

As another example the analysis process may have detected that three different credit cards were used at the same restaurant at about the same time and one of the credit cards has been determined as being in a compromised state. The scoring process can then be triggered for the other two credit card accounts and the scoring process will factor in the other two credit card accounts' information when generating a score for the third card. Accordingly whenever fraud is detected with respect to a first card, the scoring process can be triggered for any other card issued from the financial institution that was used at the same place or places as the first card.

Figure 7:
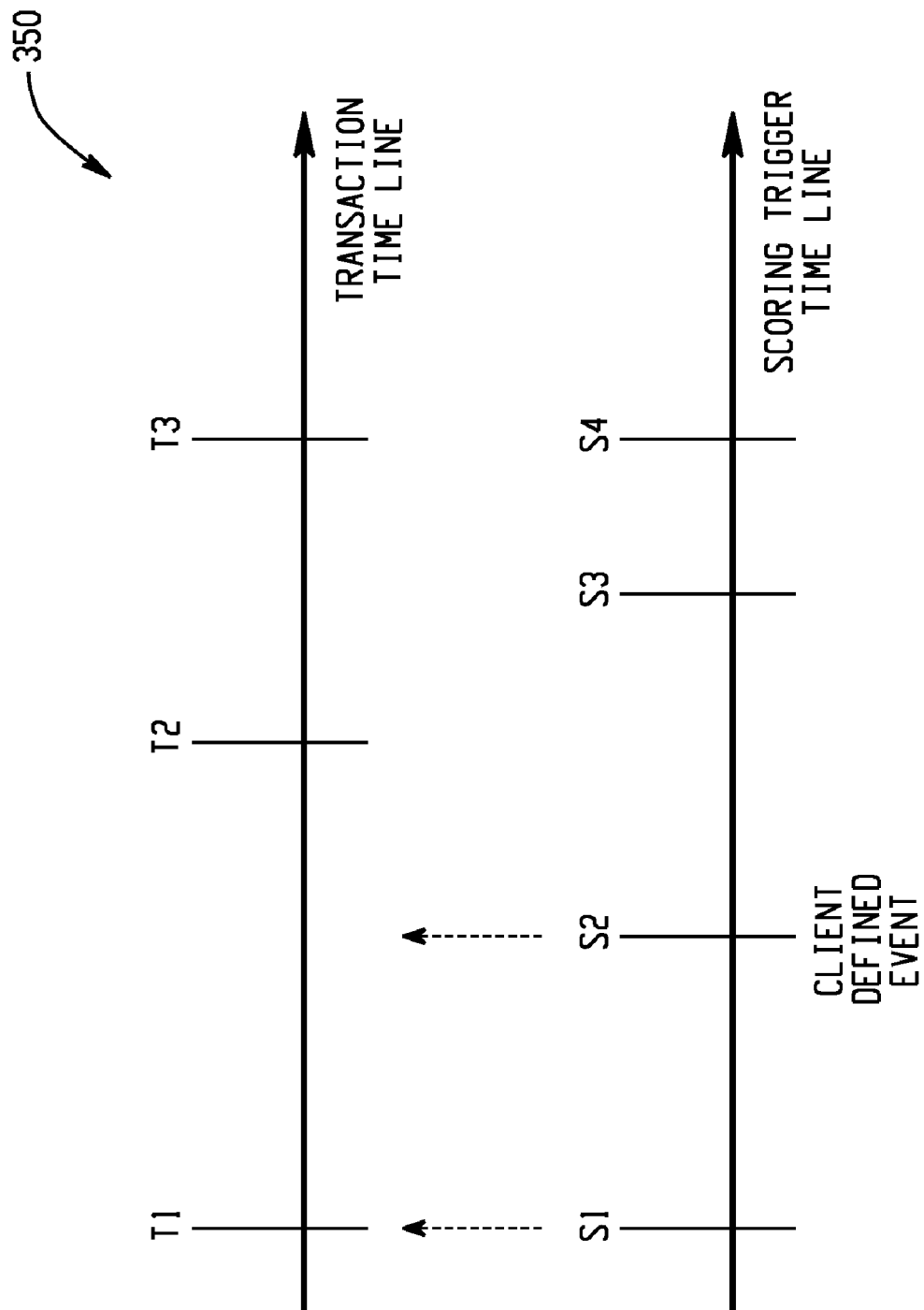
Figure 8:
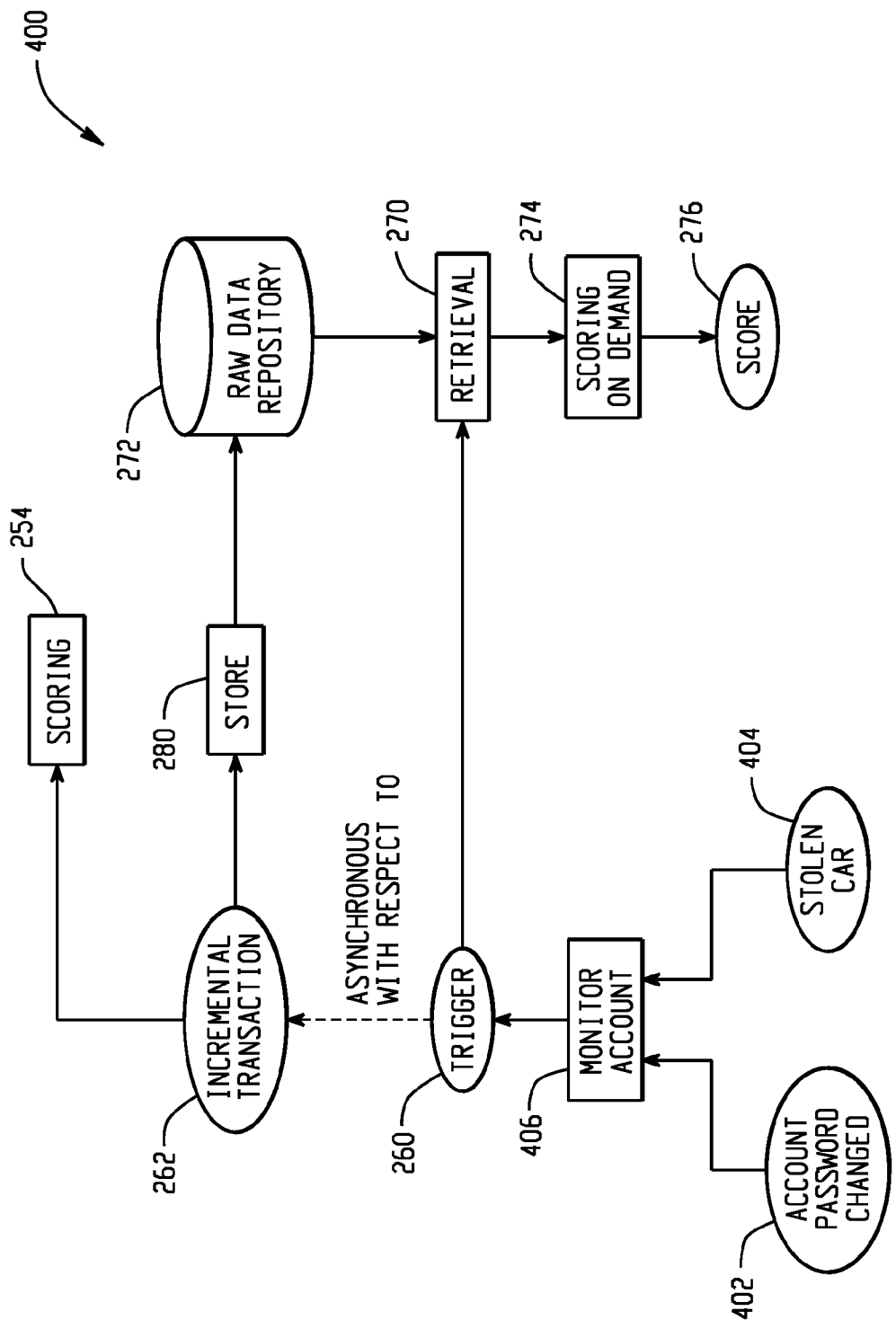
FIG. 8 is a block diagram depicting examples of client-defined events.

As shown at 350 in FIG. 7, a client can define an event that would trigger scoring of an account as shown at "S2." FIG. 8 depicts examples at 400 of client-defined events which could be an event wherein an account's password is changed as shown at 402 or a customer's car is stolen as shown at 404. A monitoring process 406 can determine when one of these triggers has occurred with respect to an account. These triggers indicate when data is to be extracted from a repository 272. For the different types of triggers, a financial institution can select whether all accounts are to be processed or only certain accounts.

The updating via process 280 of the repository 272 with incremental transaction information 262 occurs asynchronously with respect to a trigger 260 for generating via process 274 a score 276 on demand. The scoring can also occur based upon the receipt of a new transaction for an account.

It is noted that an incremental transaction indicates that a transaction has occurred that increases the amount of information with respect to an account (e.g., increases information resolution). An example of this type of transaction could be a purchase event wherein an authorization is requested for money to be subtracted from an account. A non-incremental event is one where no additional information is available relative to an entity other than that there has been a passage of time. A non-incremental event can then act as a trigger that is asynchronous with respect to whether an incremental transaction has occurred or not.

This time-passage-only type of trigger is useful to an account that may be considered on the cusp or edge (e.g., is the entity going to fall fraudulent or non-fraudulent). For example a cardholder's automobile is reported as stolen. In such situations a credit card or debit card may also have been stolen and usually large dollar amount transactions are recorded within the first couple of hours after the vehicle is stolen. The system can generate a trigger every fifteen minutes for the next three hours to score the account irrespective of whether a purchase transaction has occurred. The first scoring may have a higher score because it is closer in time to when the car was reported as stolen, but each subsequent scoring within the three hour window wherein no incremental transactions has occurred can see lower scores.

As another example a fraud analyst arrives at work in the morning with a queue of accounts to analyze. The question confronting the analyst is which account the analyst should consider first. The analyst sees that scoring on these accounts has not occurred since last night. The analyst then sends a request that these accounts should be scored again. For one or more of the accounts there may have been no additional transactions since the previous night but they may receive a different score just based upon the passage of time since the previous night. The new scoring may reorder the queue (which would alter the order of accounts the analyst is to process, such as by calling customers).

Figure 9:
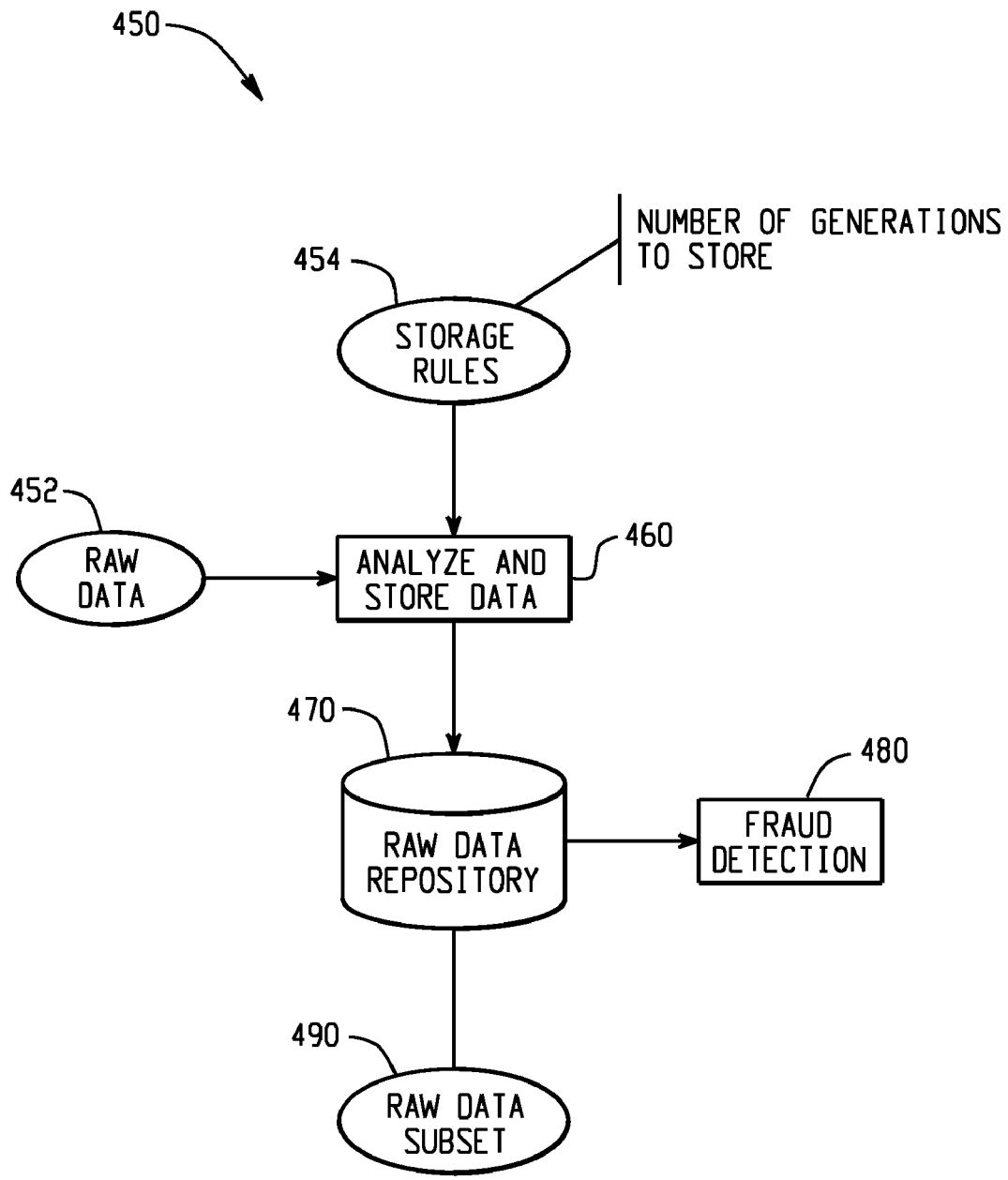
FIG. 9 is a block diagram depicting a system for storing information for use in fraud detection.

FIG. 9 depicts at 450 a system for storing information for use in fraud detection 480. The system of FIG. 9 stores the raw data 452 instead of derived feature information which is used in a typical current system. The typical current system's storage approach creates problems because there may be a need to view recent transactions in context of the account's or card's past history. Ideally, a significant portion of the raw historical transactions could be included for each score. However, for real-time systems, this has proven to have an unacceptable impact on throughput and response time. Alternative schemes involve saving only summarized information. While this does reduce the throughput, it also limits the types of variables and the level of detail available to the model.

In contrast, the system of FIG. 9 contains a repository of historical data. This is not aggregate or derived data but raw data 452. For example no summaries or averages of raw transactional data is stored in the repository 470. Raw data 452 is being processed and stored via process 460 and then retrieved (e.g., by fraud detection process 480) in order to determine whether an entity has been compromised. In other embodiments, a combination of raw data and derived data can be stored.

Figure 10:
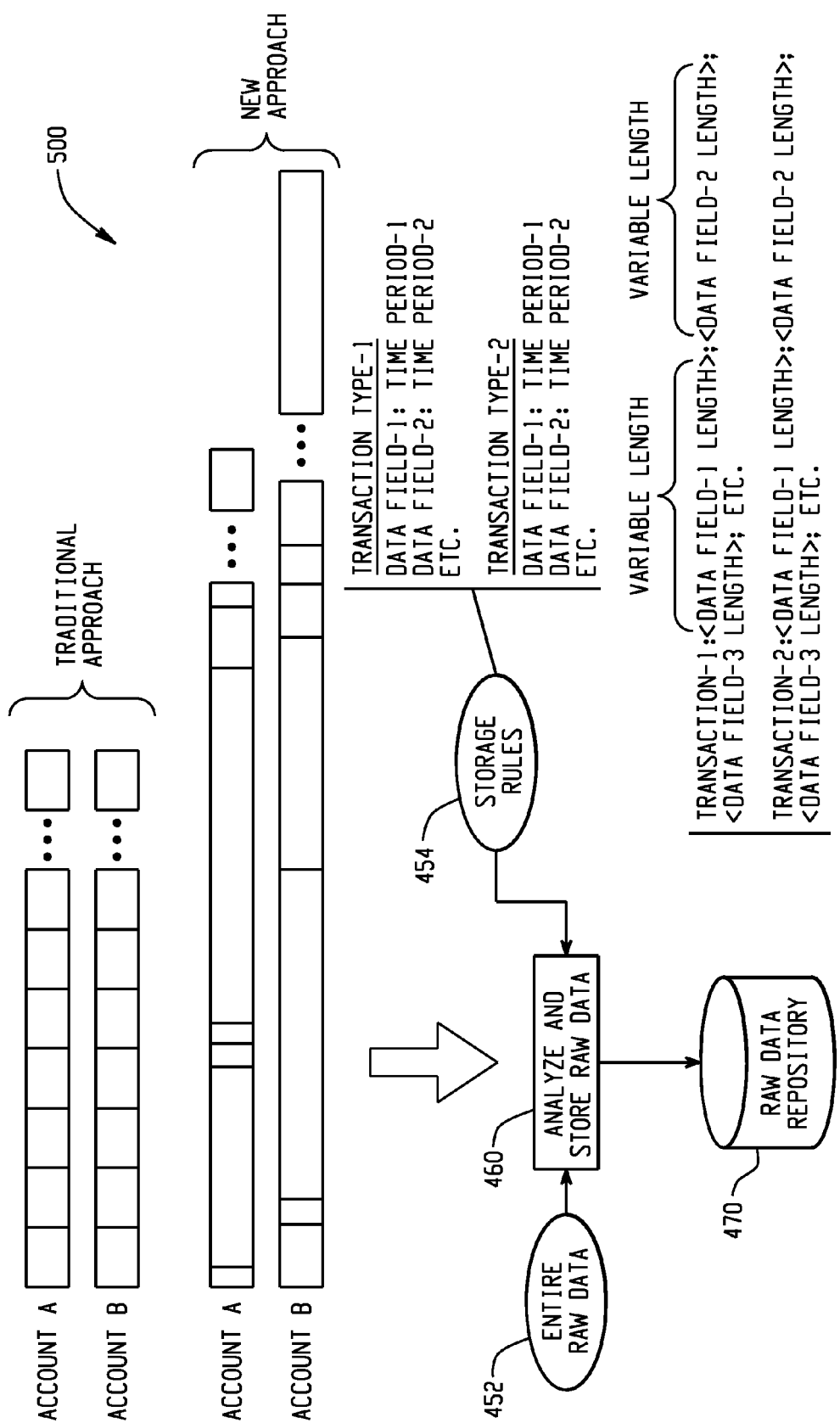
FIG. 10 is a block diagram depicting storage of fields within a data storage system.

In the system, storage rules 454 specify how many generations of raw data 452 should be stored in the repository 470. This determination could include how many raw payment amounts should be stored. The determination of how many generations should be stored is based upon the type of transaction as well as the transaction fields. This may result in varying lengths of the fields being stored in the repository 470 as illustrated at 500 in FIG. 10. For example, the payment amounts for the last seven transactions may be stored in the repository. However for another type of information, only the previous five values need to be stored. Thus the length for one field might be seven generations in length, whereas for another field, only five generations in length might be stored in the repository. An advantage of storage of the raw data (in comparison with storage of aggregate or derived data) is that information that underlines the transaction is not lost due to process that may preserve only a top-level view of what has occurred. As an example of a storage rule, a storage rule can specify how many authorization amounts should be stored for an entity in the raw state (e.g., without any aggregation or other type of transformation into a derived variable).

The data can be stored in a circular list (e.g., a doubly linked list) for each field. They can comprise varying lengths in the circular lists for the data fields. A data field may have the previous three generations stored, whereas another data field may have the previous eight generations stored. The circular lists are stored in an indexed file. However it should be understood that other storage mechanisms may be utilized such as storage in a relational database.

It should be noted that the system can still operate even if not all of the generations for a particular data field has been stored. For example a relatively new card may have only enough raw data to store three generations of payment authorization amounts although the storage rules for this data field may allow storage of up to fifteen generations. A predictive model can still operate even though a particular data field does not have all of the generations specified by the storage rules.

The storage of raw data in the repository reflects a compromise between an ideal situation where all historical information that can be obtained for an entity is stored (that is used to make a prediction) versus the physical constraints of storage capacity and/or performance. In reaching that compromise it should be noted that a less than optimal situation might exist in determining what timeframe/number of generations should be stored for one or more data fields. It should also be noted that storage rules can use the number of generations (e.g., the previous four generations) and/or a particular timeframe (e.g., only the previous three weeks) in determining how much raw data for a particular data field should be stored. For situations where more generations, longer time frames are needed for a particular data field, a multi-resolution scheme can be used. In other words, the storage can store only every k events/transactions where k varies based on the recency of the transactions/events.

Storage rules dictate how far back in history should data be stored. The history can be at different levels, such as at the transaction level or at another level such as at an individual field level. As an illustration for an authorization the system may receive an authorization amount, a merchant identifier, and a date-time stamp. The system might decide that it does not need the same history for all these different pieces of data, so the system based upon the storage rules stores the past ten transaction amounts but only the previous five merchant identifiers. Thus the buffered lengths for the different data types could vary. Even the same field (e.g., the date-time stamp field) for two different transaction types may have different storage rules. For example for one type of transaction five generations of date-time stamps may be needed but for another type of transaction eight generations may need to be stored.

The system stores information about different entities and uses the information from multiple entities to determine whether a particular account has been compromised. An entity could be a card and another entity could be an account comprising multiple cards. Another entity could comprise ZIP code. A scoring process could be performed for each entity or combinations of entities. For example scoring could be performed for the card and a separate scoring process performed for the account comprising multiple cards. Still further a scoring process could be done for a ZIP code location (e.g., generating a fraud score for a ZIP location for all of the credit card transactions that have occurred within a ZIP location).

The multi-entity repository may or may not have a hierarchical structure. A hierarchy could be multiple cards being associated with an account and another example could be multiple terminals with a single merchant. The system could look at all those hierarchies at once. In this manner by examining different entities within a hierarchy, fraud at different levels can be examined at the same time. For example a bank can determine whether fraud is localized only for a particular card or is more pervasive and extends to the merchant or to the customer's other financial instruments such as the customer's checking account.

Signatures can be used within the system in order to help store detailed, unaltered history of the account/entity. The signatures provide a complete picture of the account, allowing on-demand scoring, and not just transaction-triggered scoring. The signature allows real-time use of variables which depend upon detailed information for a number of previous transactions, for example, distances (e.g., Mahalanobis distances) between recent and past transactions.

Signatures may look different for one person versus another person. For example for a particular type of information, fifteen generations of information might be stored for a first person whereas only six generations of the same type of information for a second person might be stored. This could occur, for example, if the first person utilizes their card many more times per month than the second person.

Signature records can be retrieved for one or more entities depending upon which entities need to be scored as well as which signature records are needed for scoring a particular entity. For example a scoring process may be configured to score a credit card holder's account only by utilizing the one or more signature records associated with that credit card holder. However another scoring process could be configured to score a credit card holder's account based not only upon that entity's signature records but also based upon one or more other entities' signature records (e.g., a merchant or terminal ID signature record).

Figure 11:
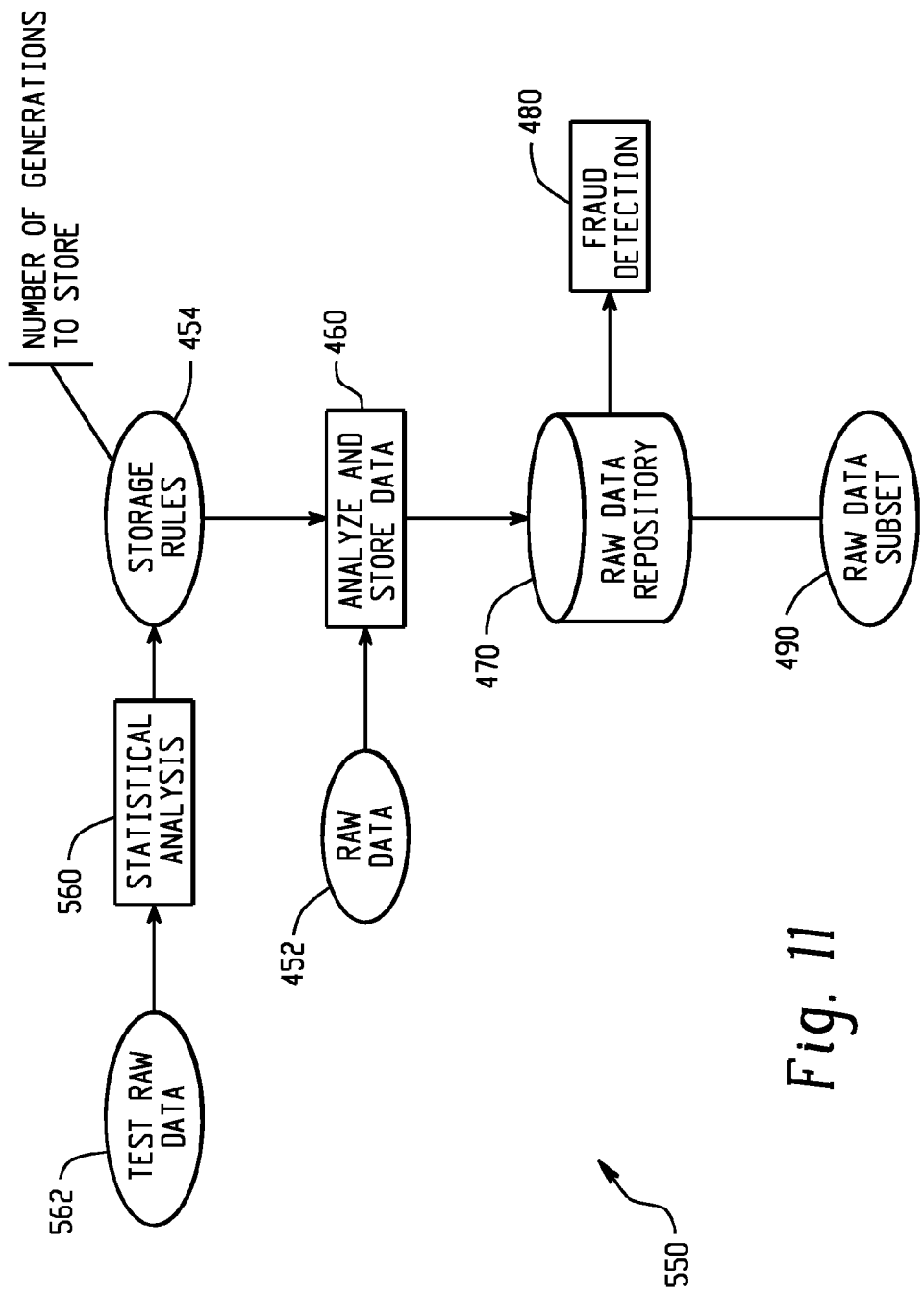
FIG. 11 is a block diagram depicting a determination of the number of generations to store for a field.

FIG. 11 shows at 550 that the determination of the number of generations (e.g., the relevant time periods) to store for a particular field for a type of transaction can be based upon statistical analysis 560. Statistical analysis 560 can analyze test raw data 562 and determine how much history (e.g., an optimal amount or approximate thereto) of raw data is needed for the application to perform well. For example a history of three months can be selected for a particular field for a particular transaction type. Analysis can be performed on the historical data to determine whether a significant change had occurred in the data the previous week versus over the previous three months. For a particular field the previous three months of raw data might be needed to help capture and explain the variability of that field whereas for another field only the past week might be needed to be captured in order to explain the variability. Statistical analysis techniques that help analyze the variability can include using mean, standard deviations, skewness, statistical distances, correlation between fields, etc. The analysis techniques can also be more sophisticated by creating models that examine variability.

Figure 12:
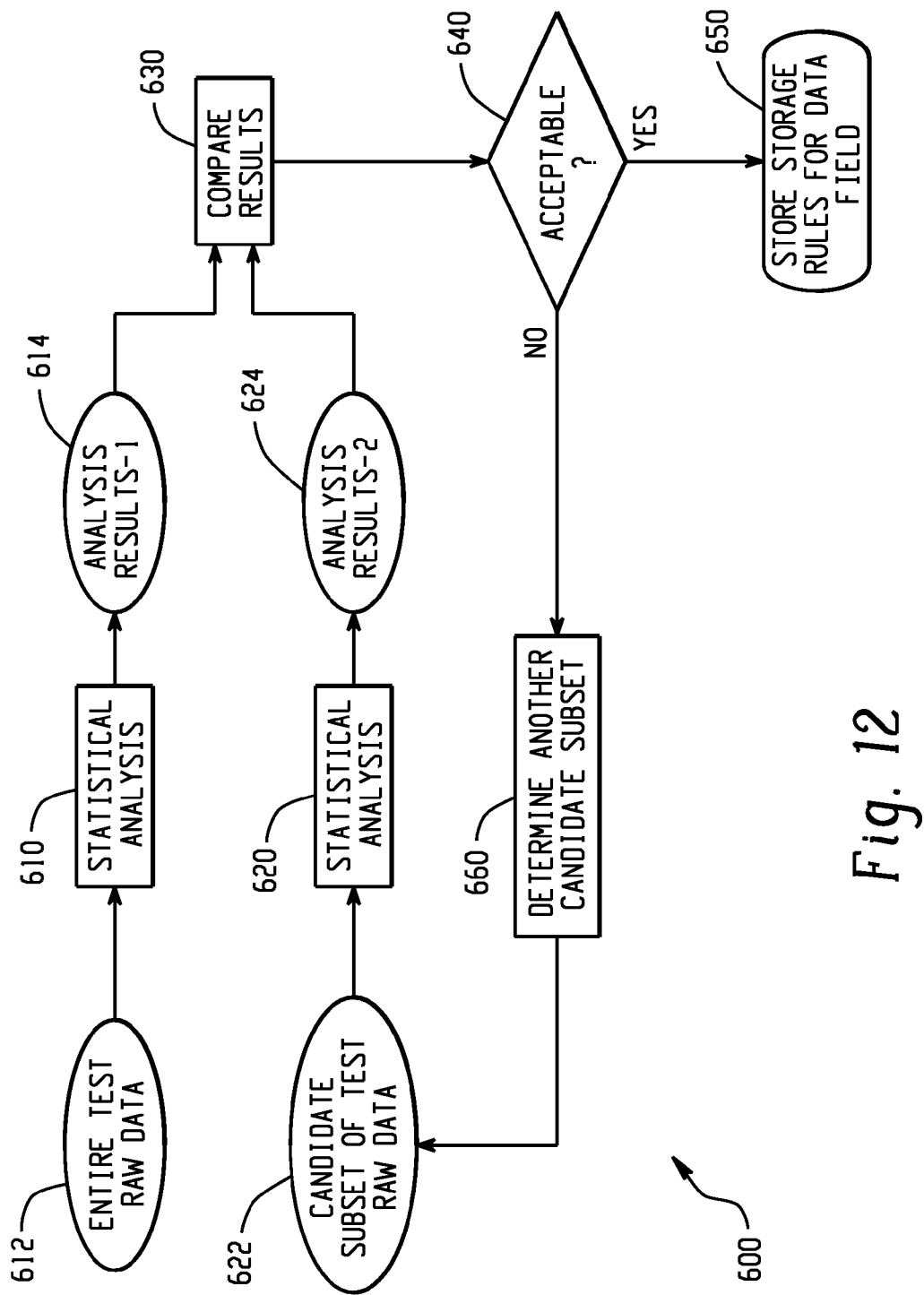
FIG. 12 is a block diagram depicting an approach to determine storage rules for a system.

FIG. 12 depicts at 600 an approach to determine storage rules for a system. Statistical analysis 610 is performed upon the entire test raw data set 612, and analysis results 614 are generated thereby. Statistical analysis 620 is performed upon a candidate subset 622 of test raw data (e.g., only the previous two weeks of raw data instead of the entire six months of data). Analysis results 624 from the candidate subset 622 are compared via a process 630 with the results generated from the full set. If the difference between the two sets of results is acceptable as determined at 640, then the storage rule is generated and stored at 650 with the time period information associated with the candidate subset. If it is not acceptable, then another candidate subset can be examined 660.

Figure 13:
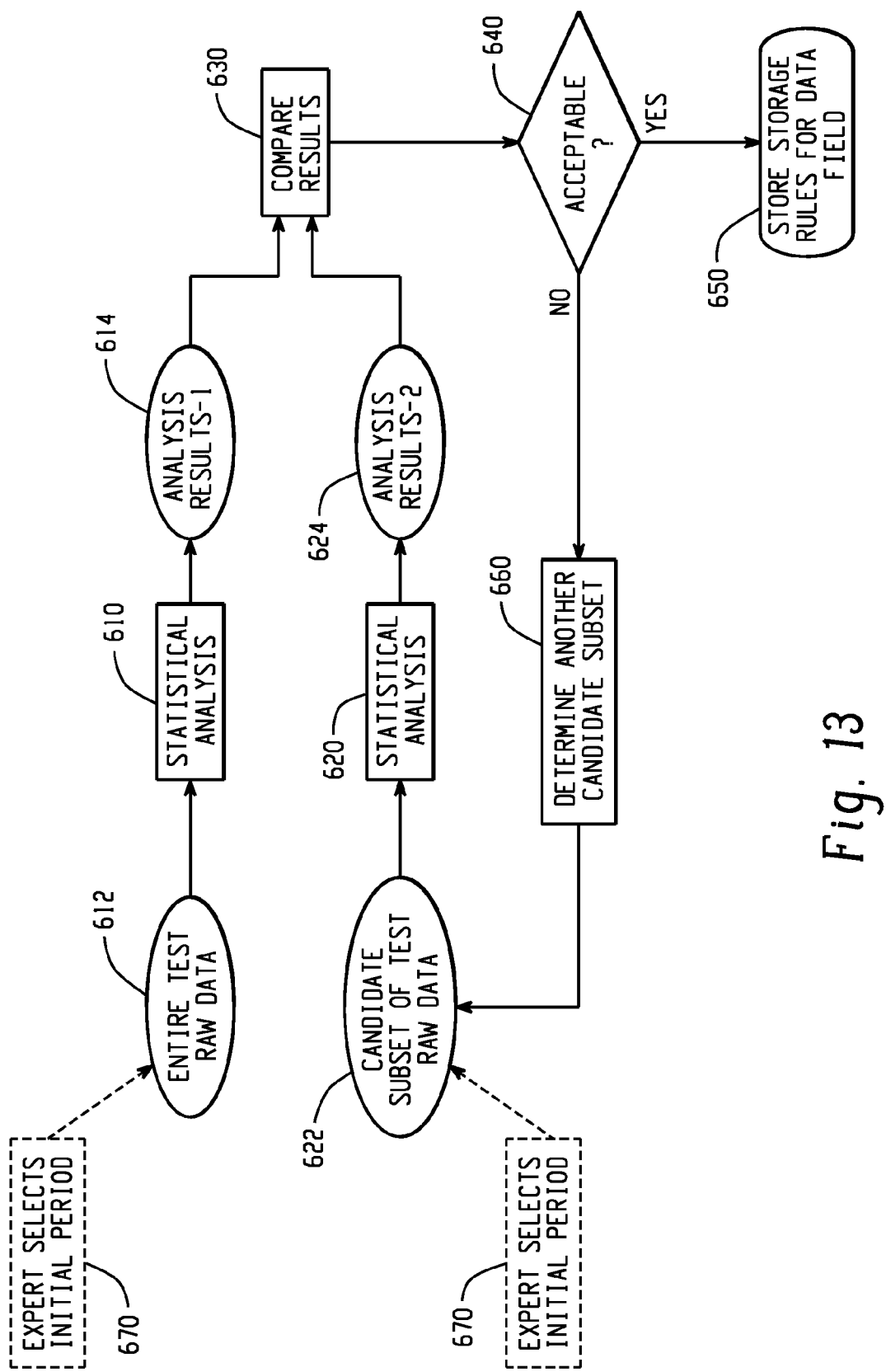
FIG. 13 is a block diagram depicting another approach to determine storage rules for a system.

As shown in FIG. 13, the analysis techniques can be supplemented based upon any experience that a person has with respect to one or more data fields. As an illustration a person can recognize from experience that storage of more then six months for a particular data field is not needed in order to provide any greater predictive capability. As another illustration and as shown at 670, a domain expert can provide an initial estimate as to what the longest period of time for the data or a data field should be and the domain expert could also indicate an initial estimate for what the expert considers to be the number of generations that should be stored in the raw data repository. For example, an expert based upon his or her experience believes that only three months of information is needed for a particular data field. The expert in this situation can indicate that the statistical analysis technique or techniques should evaluate six months of data for that data field and that the techniques should evaluate whether a good or optimal point in time might be the storage of three months of data.

Figure 14:
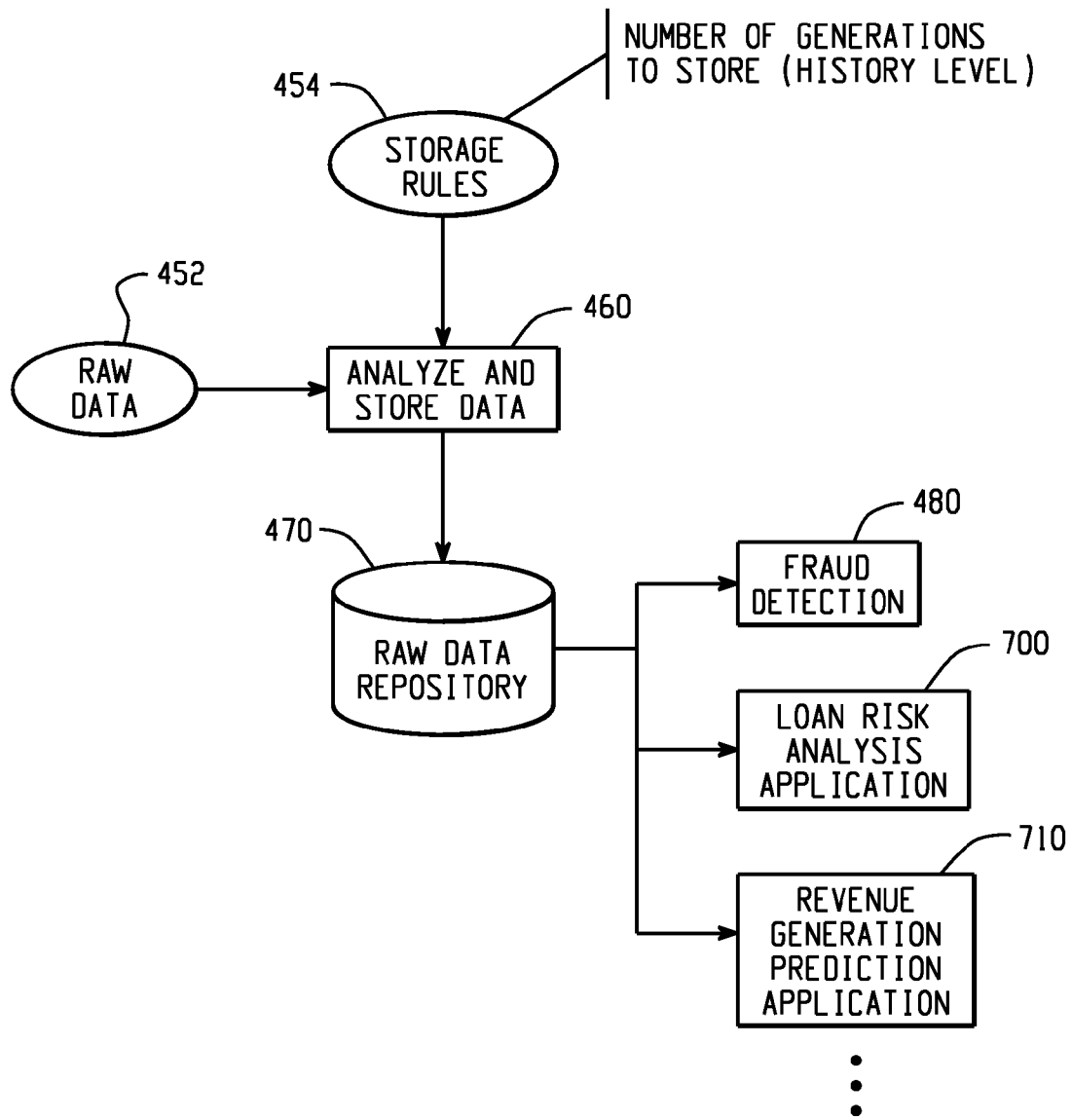
FIG. 14 is a block diagram depicting storage of information in its raw/unprocessed form.

FIG. 14 illustrates that the storage of information in its raw form makes the system much less application-specific. FIG. 14 shows that in addition to fraud detection 480, information in the raw data repository 470 can also be used by other applications, such as by a loan risk analysis application 700 or an application 710 that examines the revenue expected to be generated from this account holder over a prolonged period of time. In this way a financial institution only has to provide the information to the analysis system once instead of having to provide the same information multiple times for each of the different applications.

Figure 15:
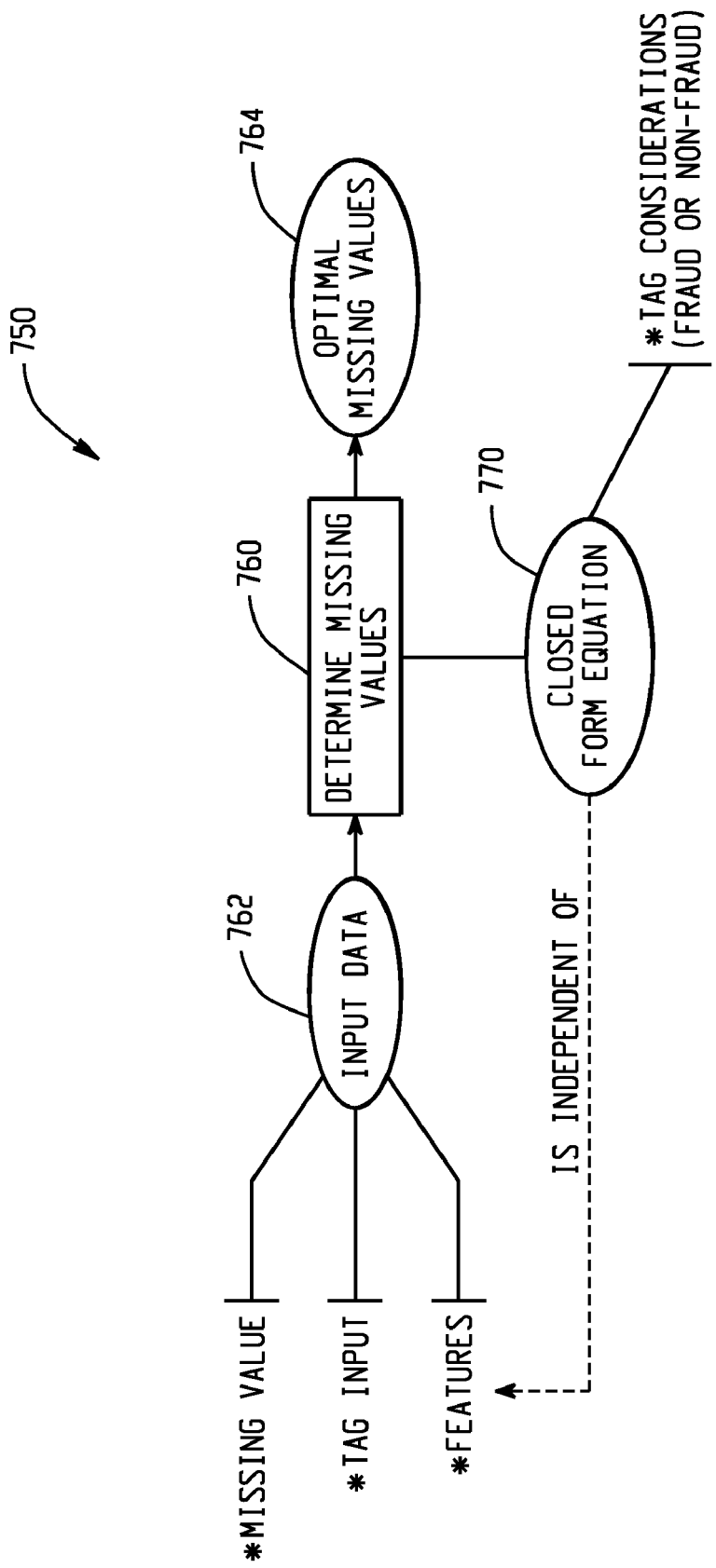
FIGS. 15-18 are block diagrams depicting systems configured with missing value imputation processing capability.

The data that is retrieved from a data store for use in an application such as fraud detection may have missing data values. With reference to FIG. 15, a system 750 can be configured that has missing value imputation processing capability 760. Process 760 can fill in values that are missing from a retrieved data set 762.

Missing values can occur because in practice an entity (e.g., a financial institution) supplying the raw data may not have all of the information regarding the transaction. As an illustration, one or more data items associated with a point-of-sale transaction might be missing.

The missing value imputation process 760 attempts to determine the missing value(s) at 764. Current approaches typically use a most common value approach (e.g., mean, mode, median) in place of a missing value. In contrast, the system of FIG. 15 uses a closed form equation 770 to determine what value (e.g., optimal value) with respect to a target should be used for a missing value. The optimal value provides more information with respect to whether fraud has occurred or not. It should be noted that this approach can be utilized for many different applications other than fraud detection, such as determining credit worthiness for a loan applicant. If the system is configured with a raw data repository, the optimal values can be determined for different applications because the raw data is stored in the repository.

In a production mode, missing values can also occur and thus a closed form equation or lookup table (whose values are based upon the closed form equation) can be used to supply missing values.

Figure 16:
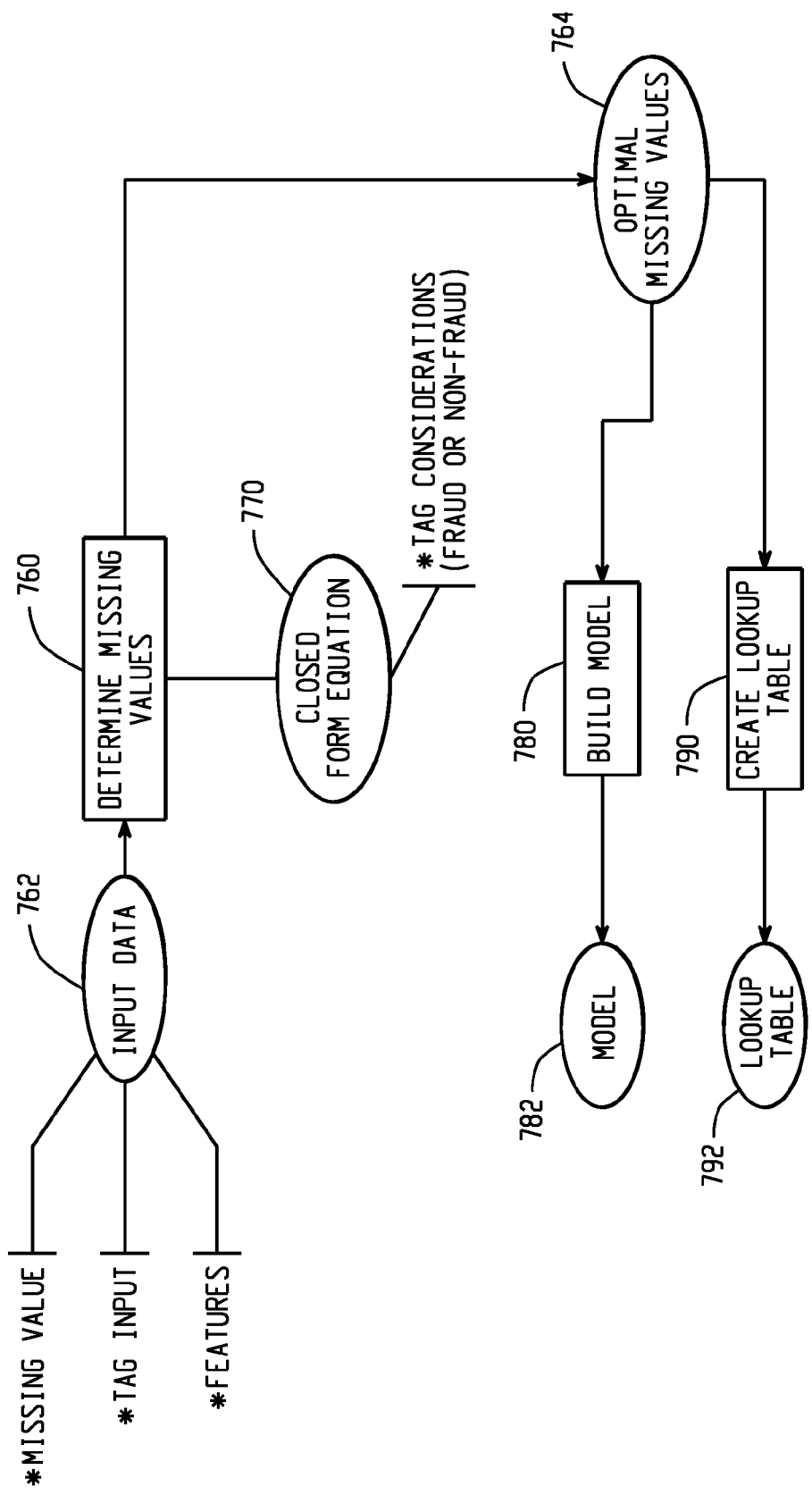

The system can use an approach wherein irrespective (e.g., independent) of the feature an equation is used to calculate the missing value. For example and as illustrated in FIG. 16, if the transaction amount is missing, then a closed form equation is used in the model building phase 780 to determine the missing transaction amount value for use in building model 782. In the production phase a lookup table 792 is created via process 790 and used to supply the missing transaction amount value. It should be understood that any value type can be supplied, such as continuous values (e.g., a numeric transaction amount).

The missing value determination process uses the tag information that accompanies the missing value in order to determine the missing value. In a fraud detection application, the tag information would indicate whether there was fraud or no fraud associated with the input data.

In the model construction backend phase 780, the values that are supplied for the missing values are used to help train or test one or more models 782 that are under construction. In the production phase, the values supplied for the missing values are used as part of the input layer to the predictive model for the application at hand.

Figure 17:
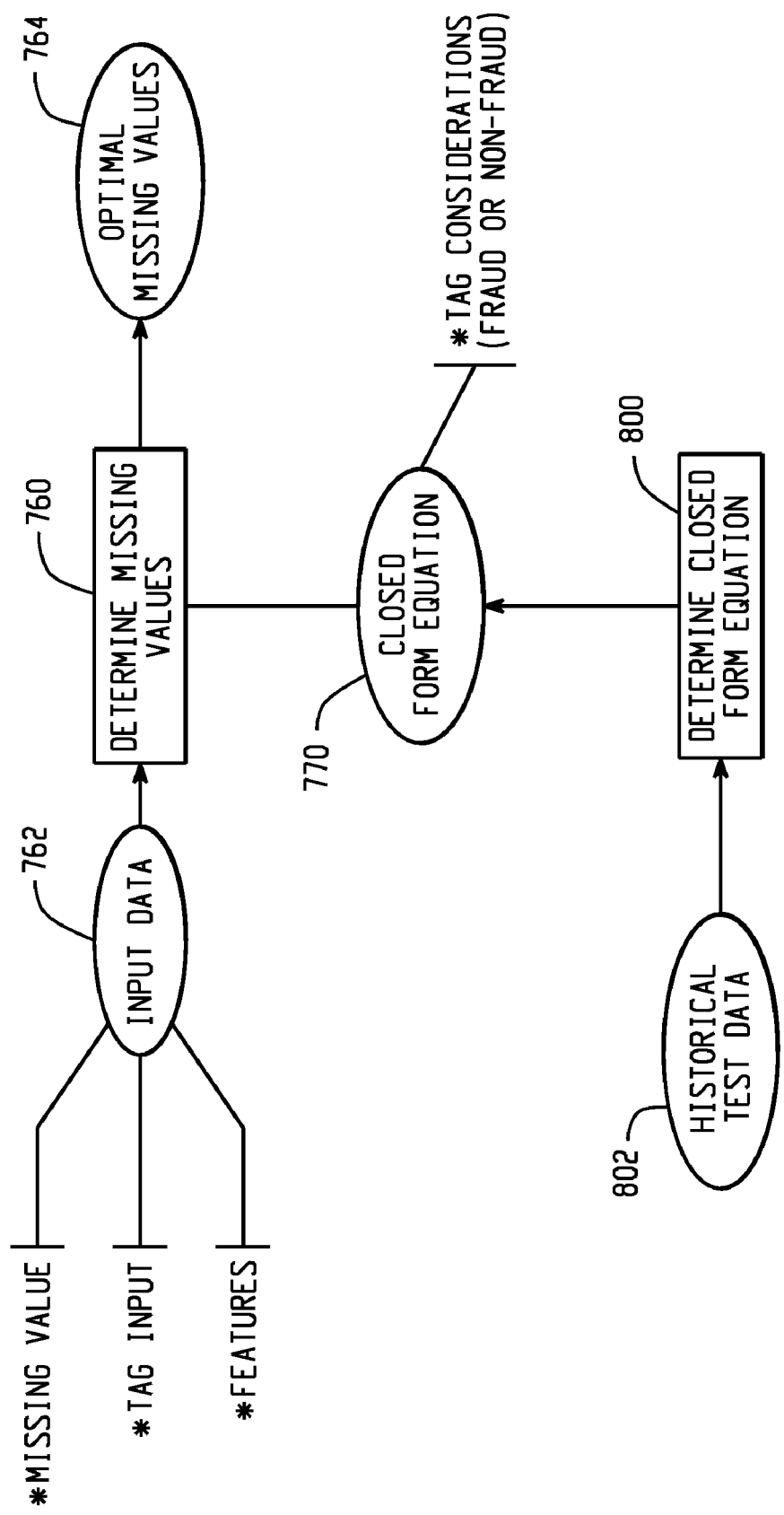
Figure 18:
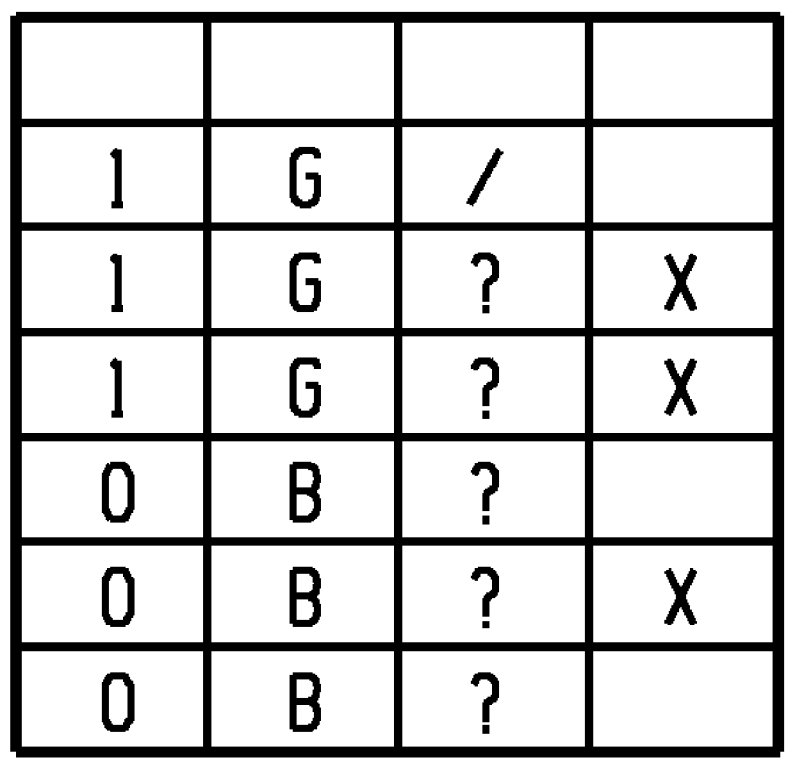

With reference to FIG. 17, a closed form equation 770 is generated via process 800 for a data feature based upon historical data by using an optimality criterion involving the tag information. The correlation can be examined via a linear or nonlinear relationship. FIG. 18 provides at 850 an illustration wherein if there are six values and G is assigned a value of one and B is assigned a value of zero, then if one or more values are missing from the input data set, then the optimality criterion could be used for determining what value of "x" would maximize the correlation with respect to the tag information.

Traditional methods of creating a payment-card fraud detection system involve training a neural network model. In general, one or more distinct models are trained independently using an error function whose result is evaluated on each transaction. Occasionally, there are simple hierarchies of models where a second model can be trained on transactions deemed risky by an initial model. By treating all transactions independently, this methodology does not address the fact that fraud occurs at an account level. For instance, early transactions in a fraud episode are much more important than later transactions, since identifying fraud early-on implies preventing more substantial fraud losses. These training methods are also lacking some means of tying together the concomitant training of a number of different networks.

Figure 19:
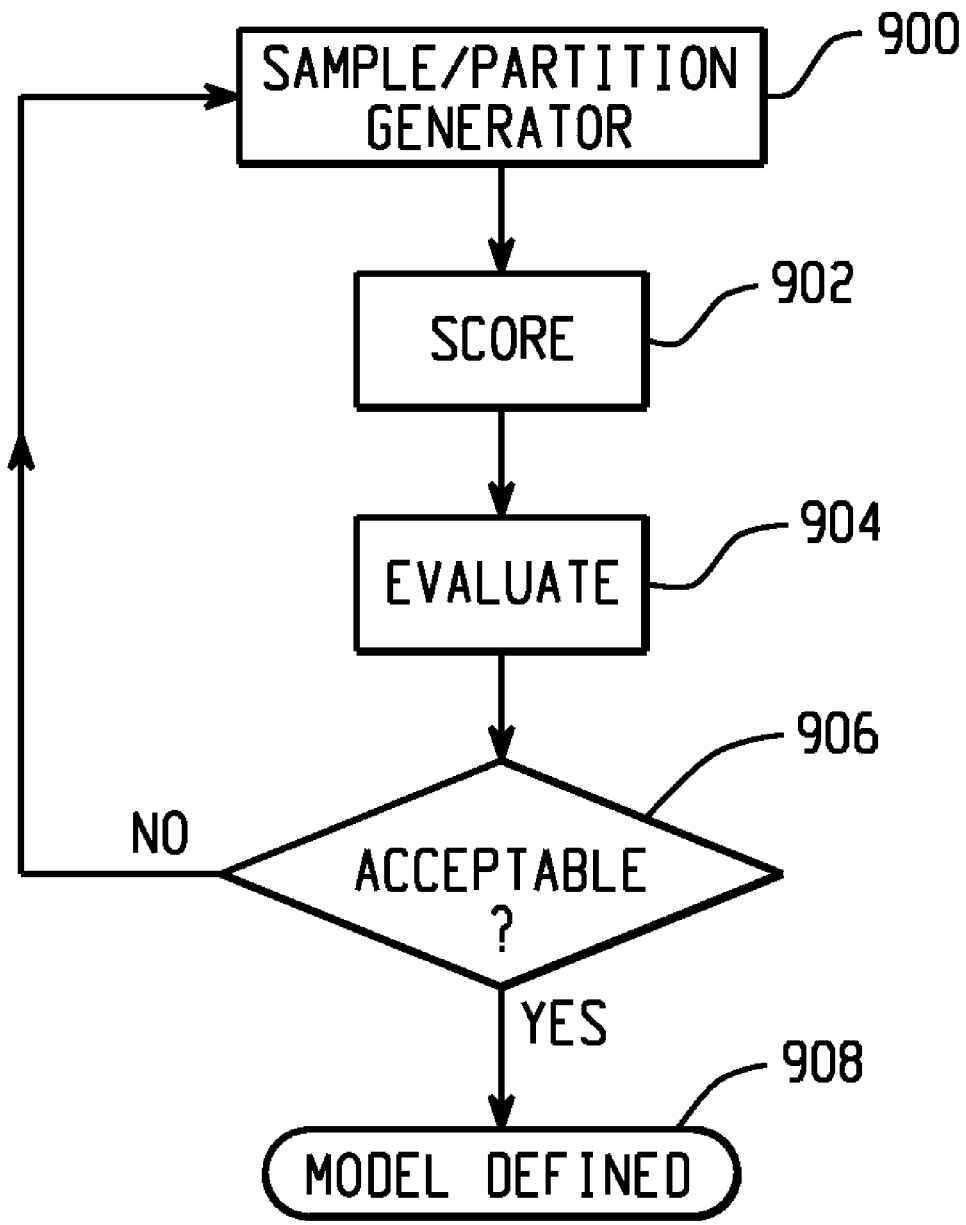
FIG. 19 is a flowchart depicting a training approach to address fraud on an account-level fashion.

FIG. 19 depicts a training approach which addresses fraud on an account-level fashion, thereby allowing fraud-level scores to be generated independent of the existence (or lack thereof) of transactions. Stated in other words, the approach provides a holistic view of the account/customer and identifies when an account is in a compromised state, as opposed to merely detecting some fraudulent transactions. This can provide value to card issuers as account-level fraud (e.g., account takeover, identity theft) has ramped up in the recent past, as compared to traditional lost/stolen card fraud. Moreover, a family of models can be generated simultaneously that optimally balance the additional benefit due to the added complexity and the added computational/operational cost.

With reference to FIG. 19, training data is received at process 900 for training a predictive model. For the first iteration, a model can be trained with the entire data set and thus not partitioned by process 900. The trained model then is scored at process 902 and evaluated at process 904. If the evaluated trained model has performed satisfactorily as determined at 906, then the model as defined through the training is made available at 908.

Figure 20:
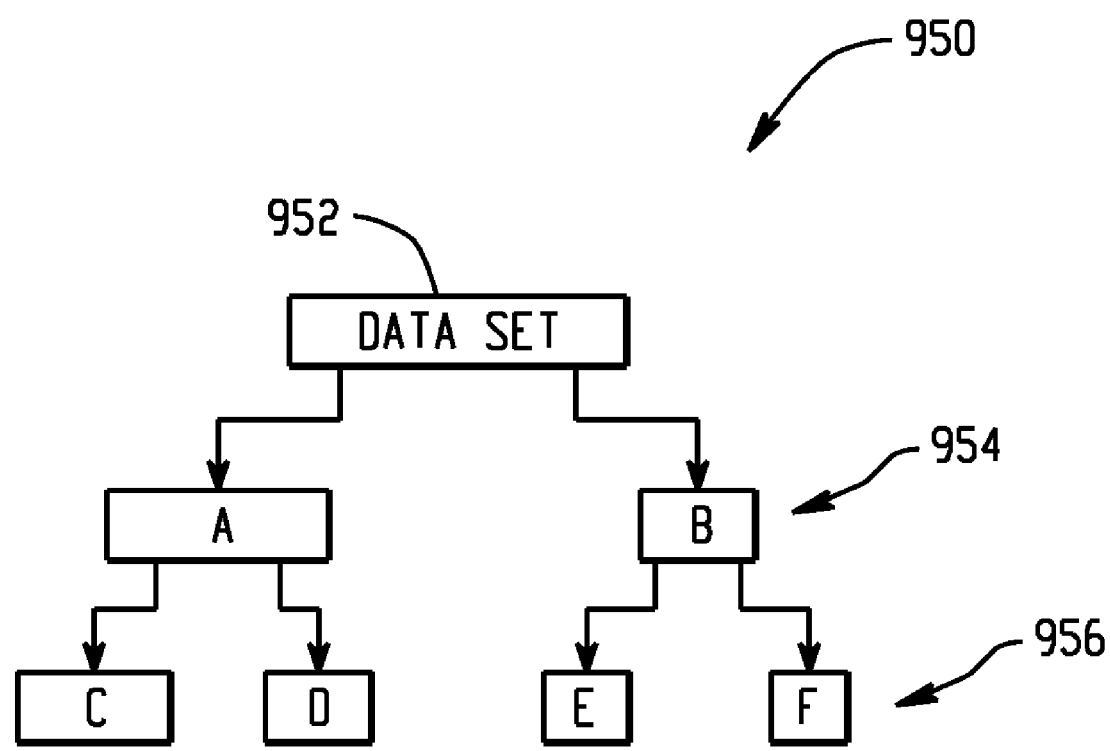
FIG. 20 illustrates a data partitioning example.

However if through the evaluation process 904, the model has not performed satisfactorily, then the training data set is partitioned by the generator process block 900. The generator process block 900 determines how the training data should be split and modeled by separate and distinct predictive models. FIG. 20 illustrates at 950 a partitioning that could occur via the generator process block.

With reference to FIG. 20, a data set 952 (e.g., an initial data set) is partitioned into multiple data subsets 954 (e.g., data subset A and data subset B). The partitioning can be performed such that the combination of data subset A and data subset B would be the initial data set. If another iteration is required, then further partitioning can be performed, such as generating data subsets C, D and if needed E, and F (as shown at 956). It should be understood that if needed these generated subsets can be further partitioned, such as partitioning F into data subsets G, H, and I.

Figure 21:
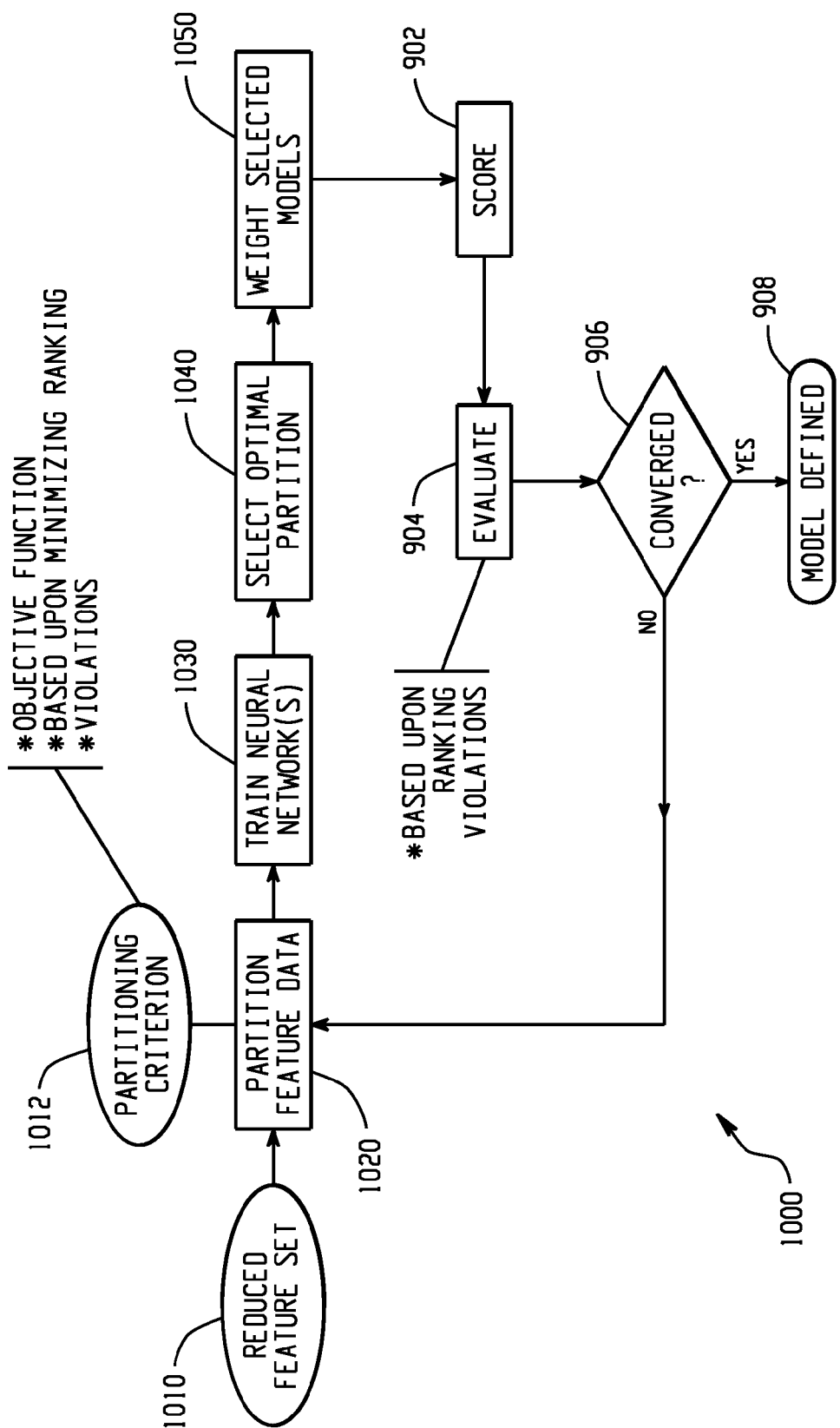
FIG. 21 is a block diagram depicting an iterative training approach.

The training could be performed in many different ways, such as the approach depicted at 1000 in FIG. 21. In this approach, a mathematical model is constructed iteratively by training and combining multiple, potentially heterogeneous, learning machines. The individual "learners" are trained with emphasis on different and overlapping regions of interest. These regions, which can be constantly evolving, are determined by a partition generator.

First, an initial model is trained at 1030 using exemplars that are partitioned from the entire training space. A data set 1010 is partitioned at 1020 in accordance with partitioning criteria 1012. The partitioning criteria 1012 is based upon minimization of a ranking violations metric. An objective function based upon minimization of a ranking violations metric is manipulated so as to minimize the area under the ROC (receiver operating characteristic) curve. An ROC is a graph showing how the false rejection rate versus true rejection rate vary (e.g., it examines the percentage of good versus the percentage of bad). The area under the curve is what is to be maximized.

A learning machine that yields distinctive rankings for each exemplar, such as a neural network, a support vector machine, a classification tree, or a Bayesian network, can be used. A partition generator then uses a selection function to be applied on the training exemplars, in order to direct attention to a subset of accounts and transactions that could improve the decision performance in the operational region of interest. The selected function can be shaped so as to further emphasize the region of interest. One or more learning machines are then trained and combined to form a final model as explained below.

At each iteration, one or multiple learning machines of various types, as well as one or multiple instances of each type of learning machine with different initial conditions are trained with emphasis on potentially different subsets of exemplars. Then the generator searches through possible transformations on the resulting machines and selects at 1040 the one that performs best for account-level fraud detection when combined with the previously selected models and the selected models are weighted at 1050.

If the newly selected learning machine did not provide additional benefit, it is discarded and the training process is restarted. After a new learner is selected, the generator directs its attention to the selection of a different subset of exemplars. The degree of attention/emphasis to each exemplar is determined by how the exemplar assists in or hurts the detection of the account being in a fraudulent state as compared to the new learning machine being disabled (i.e., not included in the overall system). As an illustration, a weight of zero or one can be assigned to each exemplar and thus form a "hard" region. As another illustration, a continuous range of weights can be used (e.g., all real values between 0 and 1) to create a "soft" region which could avoid training instabilities. The entire system including the individual "learners" as well as their corresponding regions of interest evolves and changes with each iteration.

Figure 22:
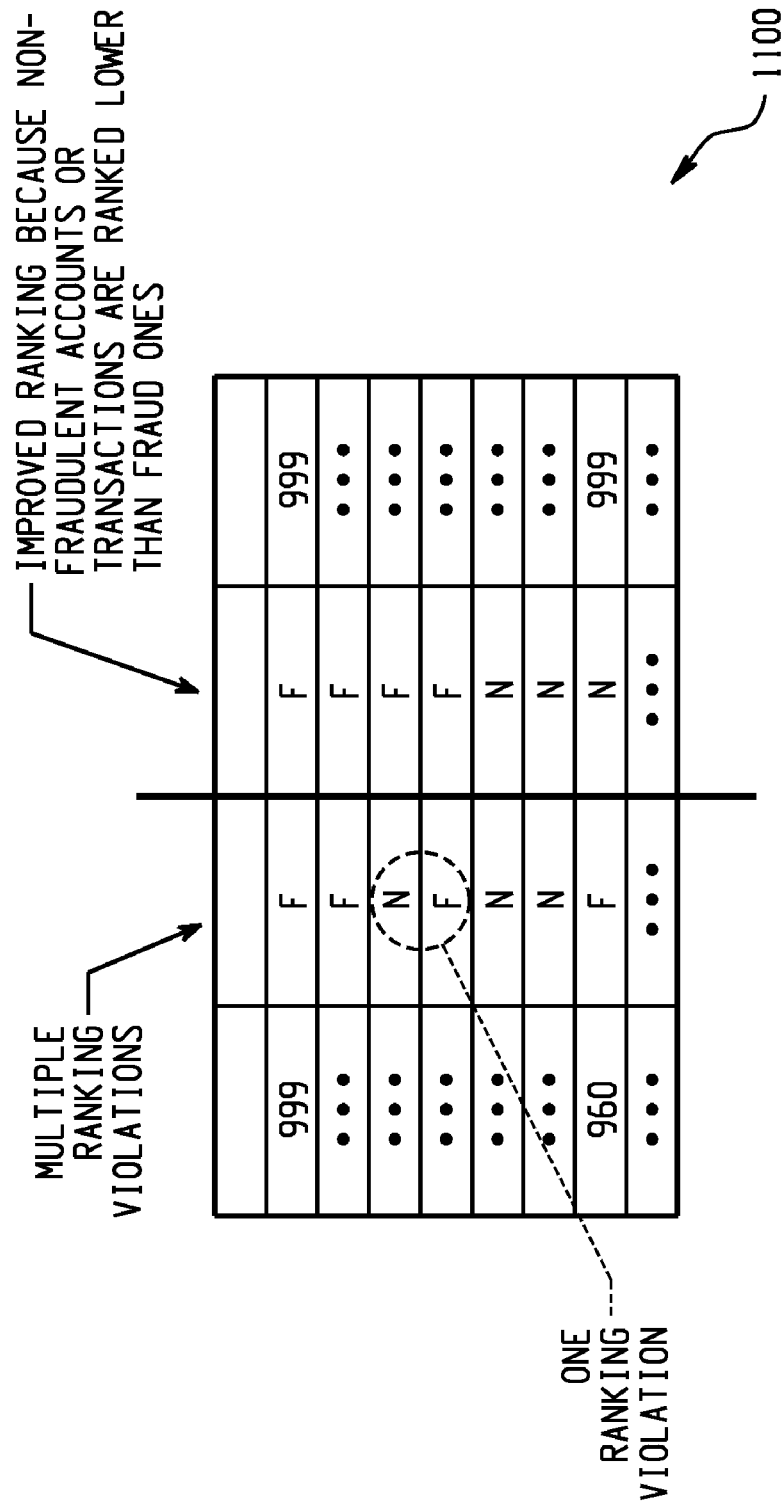
FIG. 22 illustrates example scoring results.

With respect to the partitioning process 1020, a ranking violations metric can take into account that a model should produce scores that result in non-fraudulent accounts or transactions being ranked lower than a fraud accounts or transaction. For example FIG. 22 shows at 1100 example scoring results. The model(s) that generated the scores on the left side of the table contain multiple ranking violations. The model(s) that generated the scores on the right side of the table signify an improvement in predictive capability because the non-fraudulent accounts or transactions are ranked lower than fraud accounts or transactions.

Figure 23:
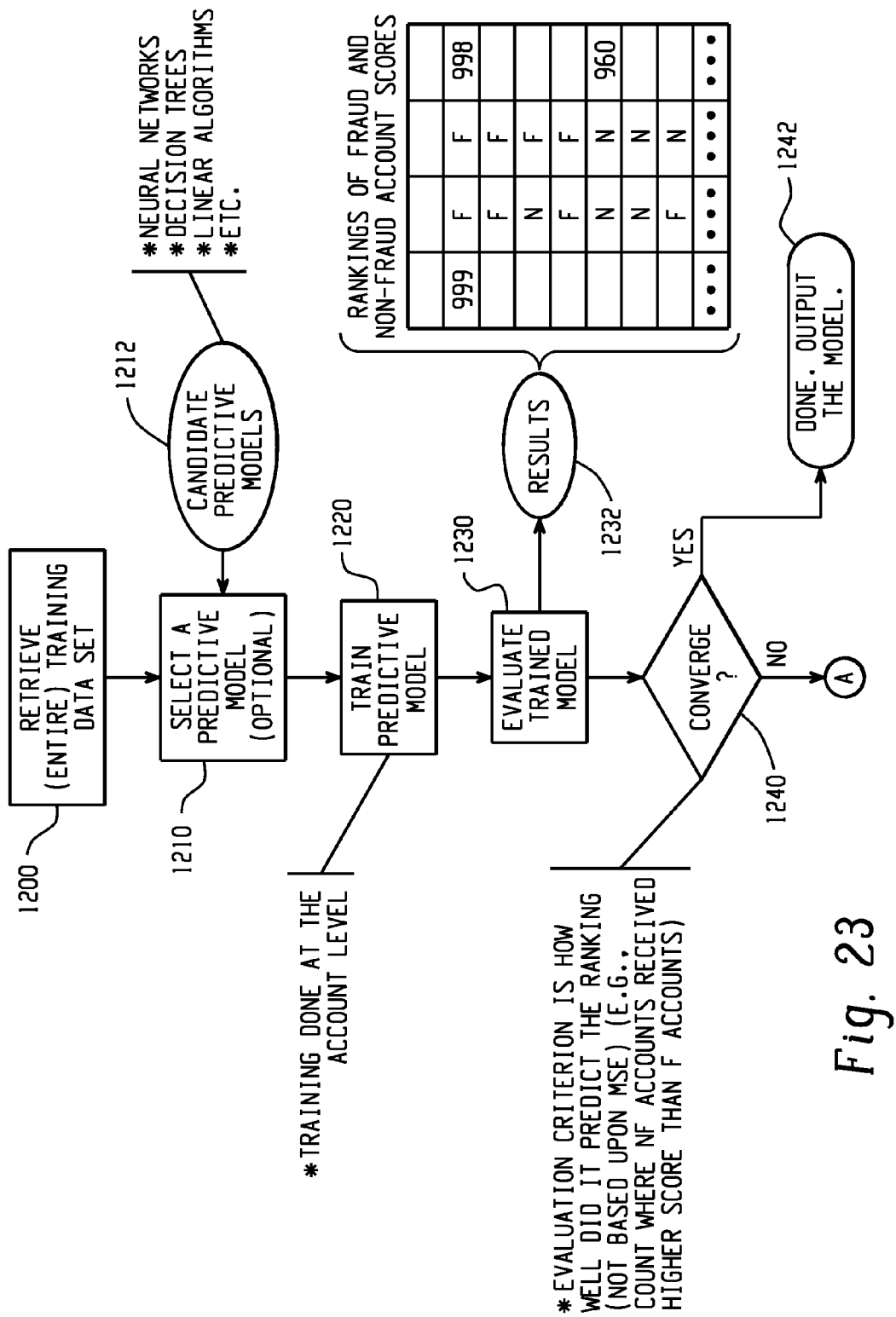
FIGS. 23-25 provide another example for training a model.
Figure 24:
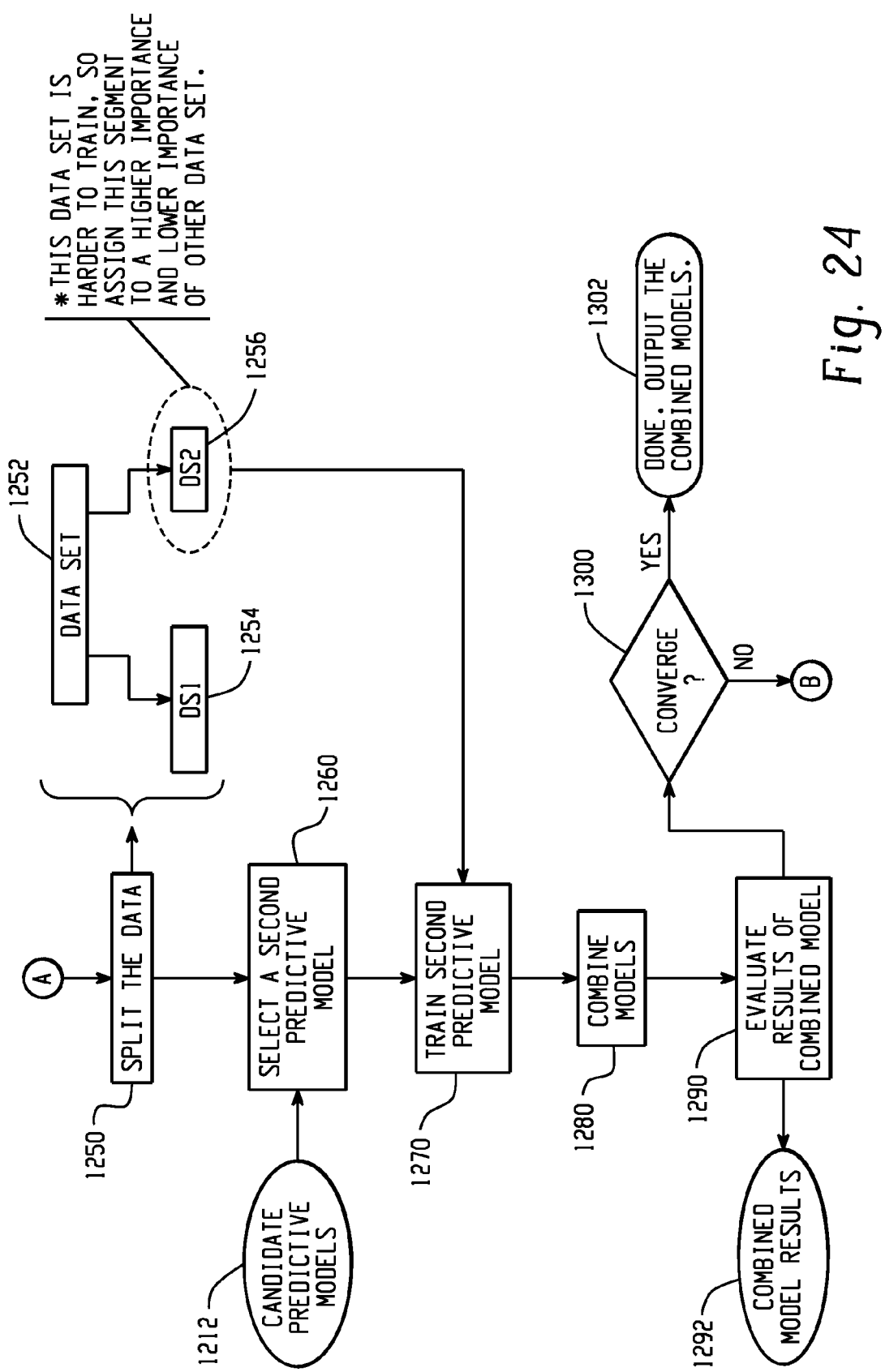
Figure 25:
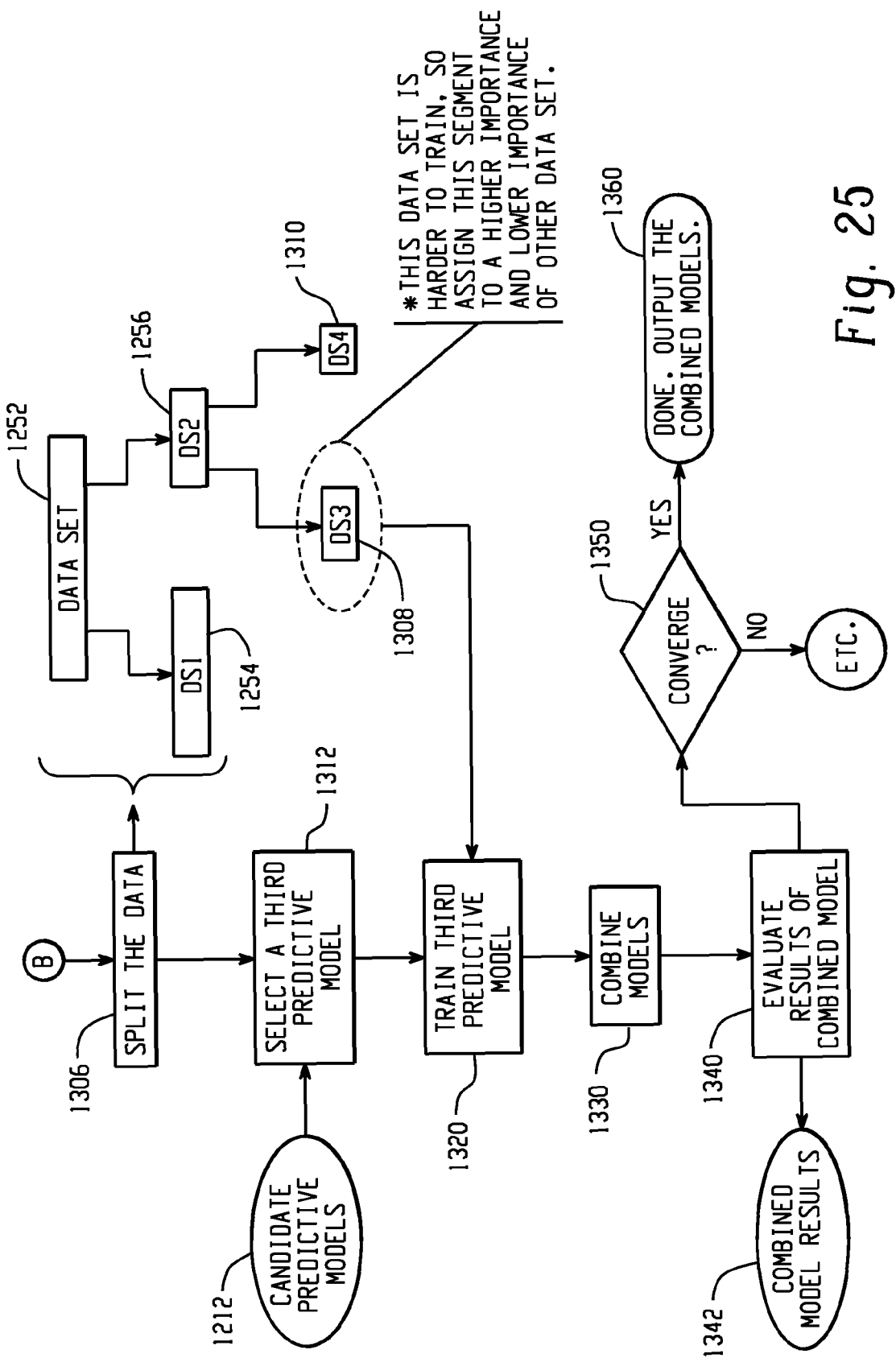

FIGS. 23-25 provide another example for training a model. With reference to FIG. 23, the entire set of training data is retrieved at 1200. If needed, one from a set of candidate predictive models 1212 (e.g., a neural network model, decision tree model, linear algorithm model, etc.) are selected for training. At 1220, a predictive model is trained with the training data. The trained one or more predictive models are scored and evaluated at 1230.

The evaluation can be based on a cost/error function. Some examples are the area under the ROC curve, $ savings, etc. The evaluation can be done at the account level. For example, an evaluation can examine the extent to which non-fraudulent accounts were ranked higher than fraudulent accounts and to what degree. However it should be understood that other levels could be used, such as having the ranking at the observation/transaction level, at the business problem level, etc.

A test for convergence is performed at 1240. If there is convergence, then the model is considered defined (e.g., the parameters of the one or more predictive models are fixed) at 1242. However if convergence has not occurred, then processing continues on FIG. 24 so that the generator process can determine at 1250 how to split one or more data sets in order to train one or more new predictive models.

The generator process determines whether the training data set 1252 should be split and modeled by separate and distinct predictive models. This allows for an automatic determination as to whether the entire training data set should be used or whether it is better to use subsets of the data for the training.

For example the generator process can determine which data subset(s) (e.g., 1254, 1256) have been most problematic in being trained. A new predictive model will be trained to focus upon that problematic data set. One way to perform this is for the generator to assign greater importance to the problematic data and lesser importance to the data that can be adequately explained with the other predictive models that have already been trained. The weighting of importance for data subsets is done at the account level.

A second predictive model is selected at 1260 from candidate predictive models 1212 and trained at 1270. The second model and the first model are combined at 1280, and evaluation of the combined models' results 1292 occurs at 1290. If the combined models do converge as determined at 1300, then the combined models are provided as output at 1302. If the combined models do not converge as determined at 1300, then the data is further split as shown in FIG. 25 so that another model can be trained.

With reference to FIG. 25, the generator process determines at 1306 how to split one or more data sets in order to train one or more new predictive models. For example, the generator process can determine whether the training data set 1256 should be split and modeled by separate and distinct predictive models. More specifically, the generator process can determine which data subset(s) (e.g., 1308, 1310) have been most problematic in being trained, and a new predictive model will be trained to focus upon that problematic data set. One way to perform this is for the generator to assign greater importance to the problematic data and lesser importance to the data that can be adequately explained with the other predictive models that have already been trained. The weighting of importance for data subsets is done at the account level.

A third predictive model is selected at 1312 from candidate predictive models 1212 and trained at 1320. The third model and the other models are combined at 1330, and evaluation of the combined models' results 1342 occurs at 1340. If the combined models do converge as determined at 1350, then the combined models are provided as output at 1360. If the combined models do not converge as determined at 1350, then the data is further split.

For performing evaluations in this training approach, the system can examine how many ranking violations have occurred. The evaluation also examines whether there is any improvement (e.g., decrease) in the number of ranking violations from the previous iteration. The convergence decision step determines whether the number of ranking violations is at an acceptable level. If it is, then the defined models are made available for any subsequent further model development or are made available for the production phase. However if the number of ranking violations is not at an acceptable level, then further partitioning occurs at the partition process block.

It should be noted that many different types of predictive models may be utilized as candidate predictive models, such as decision trees, neural networks, linear predictive models, etc. Accordingly the resultant model may be a single predictive model and/or multiple predictive models that have been combined. Moreover combined predictive models resulting from the training sessions can be homogenous or heterogeneous. As an illustration of a homogenous combined set of predictive models, two or more neural networks can be combined from the training sessions. As an illustration of a heterogeneous combined set of predictive models, a neural network model can be combined with a decision tree model or as another illustration multiple genetic algorithm models can be combined with one or more decision tree models as well as with one or more linear regression models. During training, the evaluation block assesses the performance of the combined models. The models are placed in parallel and their outputs are combined.

A predictive system can be configured to generate reason codes which aid in understanding the scores. Current methodology for producing reason codes for explaining the scores is not very useful, as it typically identifies variables that are similar in nature as the top three reason codes. This does not provide valuable insight into why a particular item scored high. This becomes important as the industry moves away from transaction-level scores for fraud detection to account-level scores identifying the account's compromise. Due to the more complex underlying phenomena, more refined and meaningful reason codes become tantamount.

Figure 26:
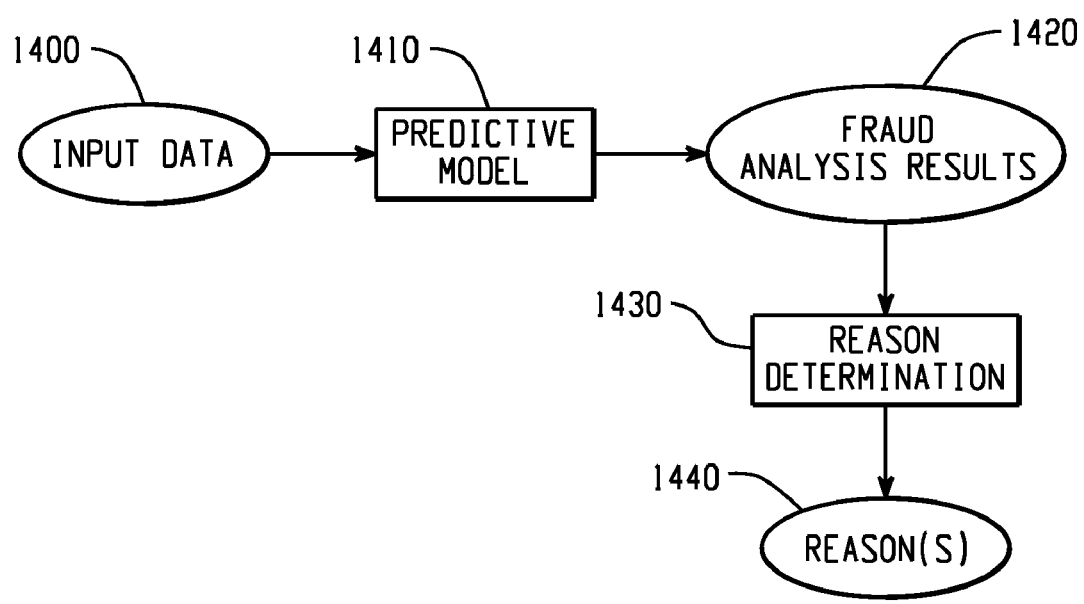
FIG. 26 is a block diagram depicting a reason code determination process that can be used to create reason codes for a scoring system/predictive model.

FIG. 26 depicts a reason code determination process 1430 that is used to create reason codes 1440 for a scoring system/predictive model 1410. It should be understood that reason codes can be used for other applications other than fraud detection. The reason code determination process 1430 can be configured having reason code technology that is based on risk factors/groups rather than individual variables used in the models. The reason codes 1440 for a scoring system are to provide insight to end users with respect to the score generated by the predictive model 1440 (e.g., the fraud analysis results/scores 1420). It provides guidance in reviewing the scoring entity and making appropriate actions and decisions. In case of fraud detection models, the reason codes provide directions for the initial investigations/review of suspect cases.

The process 1430 can provide statistically-sound explanations of the results 1420 (e.g., score) from a scoring system/predictive model 1410 that is analyzing certain input data 1400. Also, the explanations are factor based and can be used within a scoring system such as to satisfy requirements for credit scoring models under regulation B.

Figure 27:
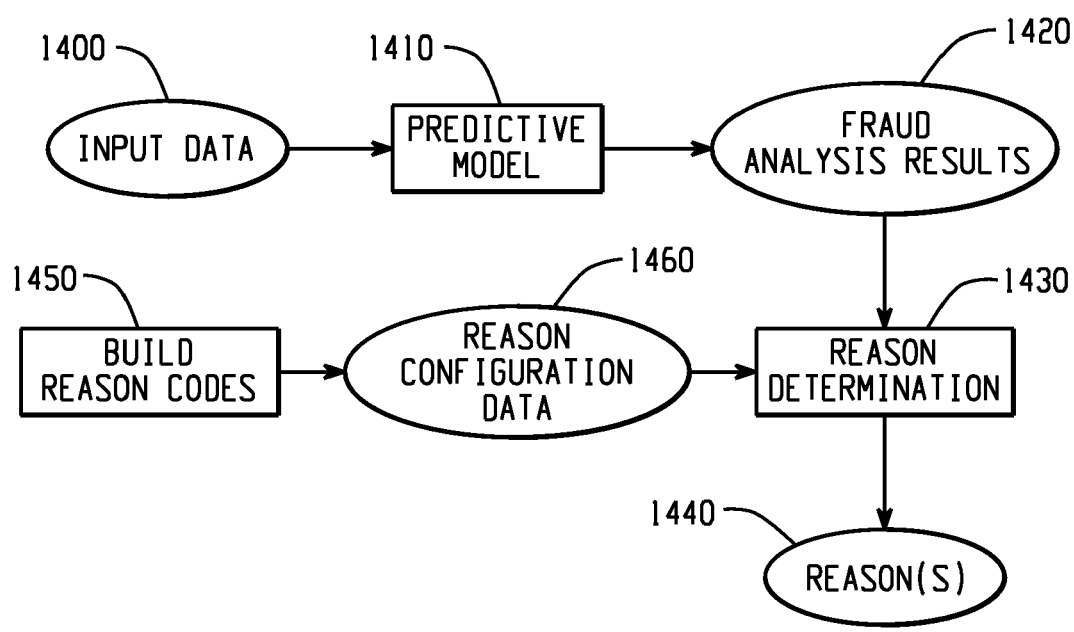
FIG. 27 is a block diagram depicting construction of reason codes.

FIG. 27 illustrates how reason codes can be built. Instead of using individual input variables as reasons, first reason factors are generated via process 1450 by grouping variables that have similar concept. Analytic techniques are used to generate these reason factors. The reason factors could then be reviewed and refined by domain experts. Once the reason factors are formed, the importance of reason factors to the score can be constructed. The reason codes can be generated by rank ordering the "importance" of each reason factor. Finally, the performance of the reason codes is evaluated. Based on the results, one can also revise the reason generator by iterating the process. The generated reasons are provided as reason configuration data 1460 to a reason determination process 1430 for use in the scoring/predicting process.

Figure 28:
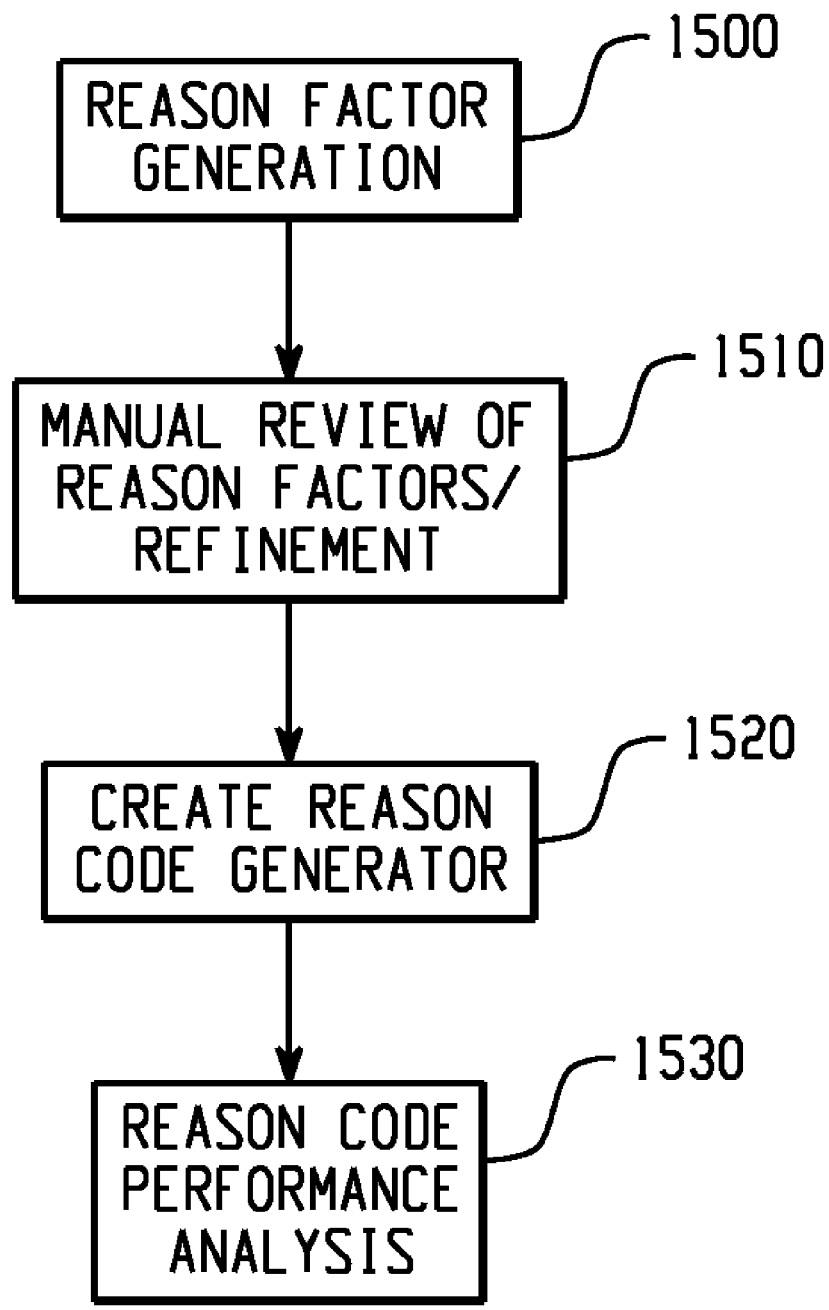
FIG. 28 is a flowchart depicting construction of reason codes.

FIG. 28 illustrates creation of reason codes. For generation of reason factors via process 1500, individual variables are not used as reasons in order to avoid top reasons providing the same information. Instead, the system first groups variables that are correlated and with similar concept into different reason factors. As an illustration, the variables that relate to the time when the transaction occurred can be grouped separately from variables that do not relate to that. Many statistical techniques can be used to group the variables. Each variable group (e.g., a reason factor) can represent a reason code.

Principal Component Analysis (PCA) techniques can be used in the reason factor generation step in order to generate factors or groups that are orthogonal with respect to each other. Such technique is implemented in SAS PROC VARCLUS which is available from SAS Institute located in Cary, N.C. There are many different configurations to generate the variable grouping and they are available as options in PROC VARCLUS. For example, the number of reason factors can be controlled by specifying the number of variable clusters to be created. The reason factors generated by the PCA are then manually reviewed and refined at 1510.

Manual review and refinement of the reason factors can be performed in many ways. For example, this could include sanity checking the variable grouping as well as creating user-friendly description for each variable factor. The groupings may be revised/refined based on domain expertise and previous results, and the configuration file is prepared for the reason code generator step.

A reason code generator is created at 1520 by constructing and measuring the importance for each reason factor to the score. The importance can be defined in many ways. It can be (1) the strength of the reason factor to explain the current score; (2) the strength of the reason factor to make the score high; etc. The importance of these reason factors are then rank-ordered. The top most important factors are reported as the score reasons. The number of reasons will be based on the business needs.

Figure 29:
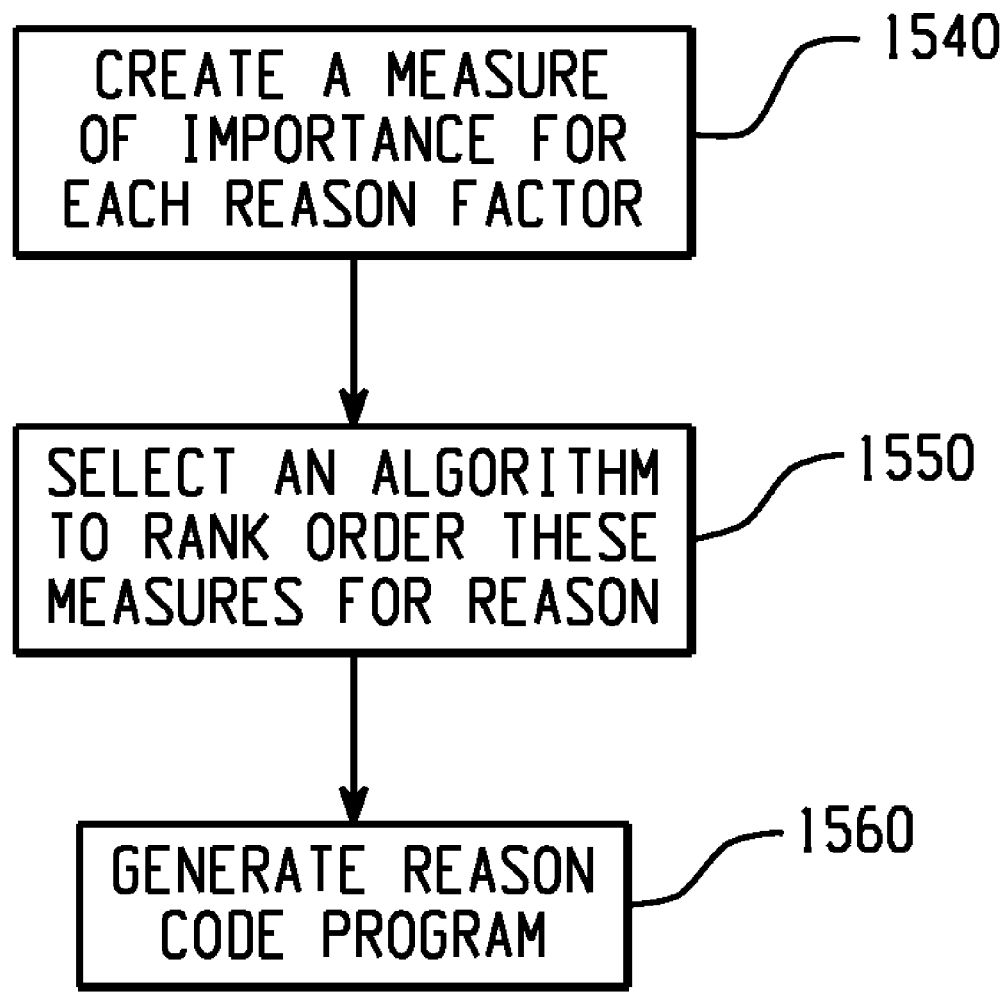
FIG. 29 is a flowchart depicting importance of a reason factor to a score.

With reference to FIG. 29, the importance of each reason factor to the score could be measured by a tree model at 1540. These tree models are constructed at 1550 to extract the correlations between the values of the variables in the given reason factor and the score, and they can be built at 1560 using a SAS Enterprise Miner tree procedure/SAS PROC ARBORETUM available from SAS Institute located in Cary, N.C. By rank ordering the estimated scores for the tree models, the top corresponding reason factors are then selected as the reason codes.

With reference back to FIG. 28, the performance of the reason code is then analyzed at 1530. The general performance of the reason code generator is reviewed. Other items used in analyzing the performance of the reason code could include:
  frequency of the reason code
  most common reasons/combination of reasons
  frequency of reason code by score range
  manual review of cases to check the validity of the reason codes
  case reports to be generated for review
  based on the result, one may revise the reason factors grouping and renew the reason code generation step While examples have been used to disclose the invention, including the best mode, and also to enable any person skilled in the art to make and use the invention, the patentable scope of the invention is defined by claims, and may include other examples that occur to those skilled in the art.

For example, the systems and methods disclosed herein may be used for many different purposes. Because the repository stores raw data (as opposed to derived or imputed information), different types of analysis other than credit card fraud detection can be performed. These additional analyses could include using the same data that is stored in the repository for credit card analysis to also be utilized for detection of merchant fraud or for some other application. Derived or imputed information from raw data does not generalize well from one application (e.g., cardholder account fraud prediction) to a different application (e.g., merchant fraud prediction).

Figure 30:
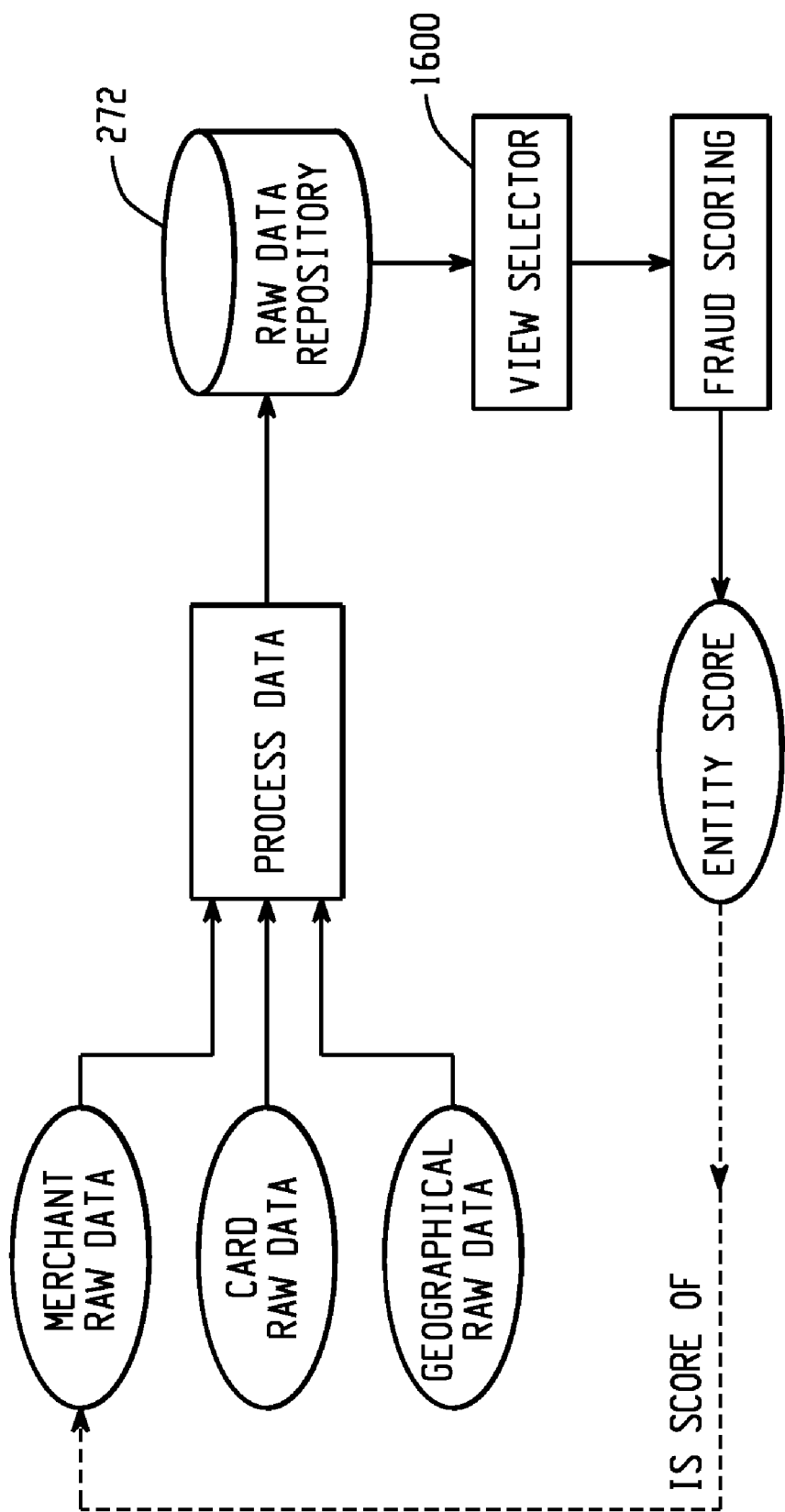
FIGS. 30-32 are block diagrams depicting a view selector module that allows a user or computer program to select an entity or type of entity for analysis.
Figure 31:
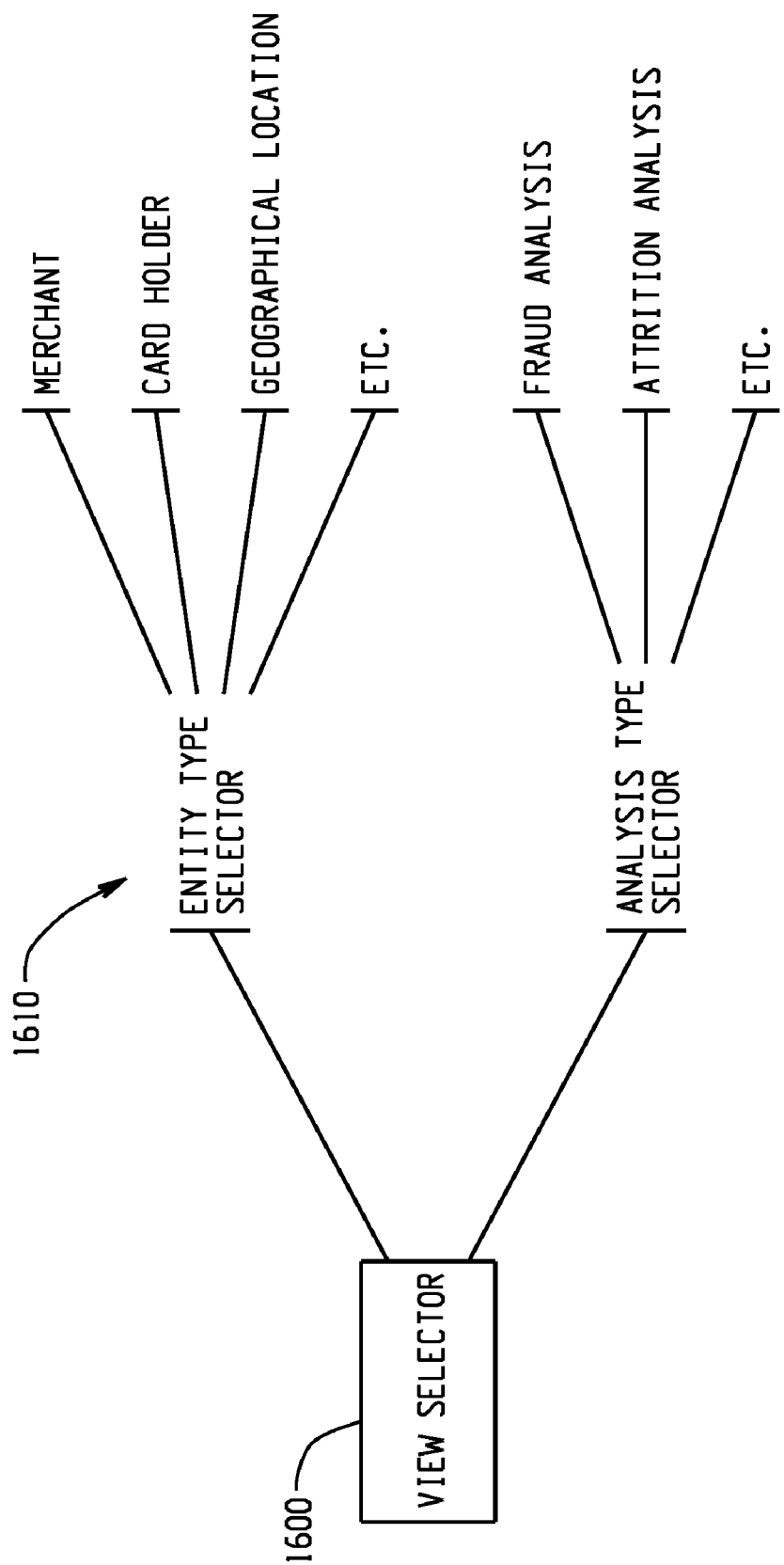

FIGS. 30 and 31 depict that a view selector module 1600 can be provided that allows a user or computer program to select which entity (e.g. a particular merchant) or type of entity (e.g., all merchants) upon which they would like fraud analysis to be performed. For example a user or a computer application can shift the view from whether a cardholder account has been compromised to whether fraud has occurred at one or more merchants. The raw data that is used to predict whether fraud has occurred with respect to a cardholders account can also be utilized to predict whether fraud has occurred at a merchant location.

Other types of analysis can also be performed because the data is stored in its raw form, such as merchant attrition. Merchant attrition is when an institution loses merchants for one or more reasons. A merchant attrition score is an indicator of how likely a relationship between a merchant and an institution will be severed, such as due to bankruptcy of the merchant or the merchant porting its account to another institution (e.g., to receive more favorable terms for its account). To determine a merchant attrition score, the raw data in the repository 272 that can be used for fraud scoring can also be used in combination with other data to calculate merchant attrition scores. The other data could include any data (raw or derived) that would indicate merchant attrition. Such data could include the fee structure charged by the institution to handle the merchant's account, how timely payments are provided by the merchant on the account, etc. Accordingly in addition to an entity view selector, a system can be configured with a selector 1610 that selects what type of analysis should be performed.

Figure 32:
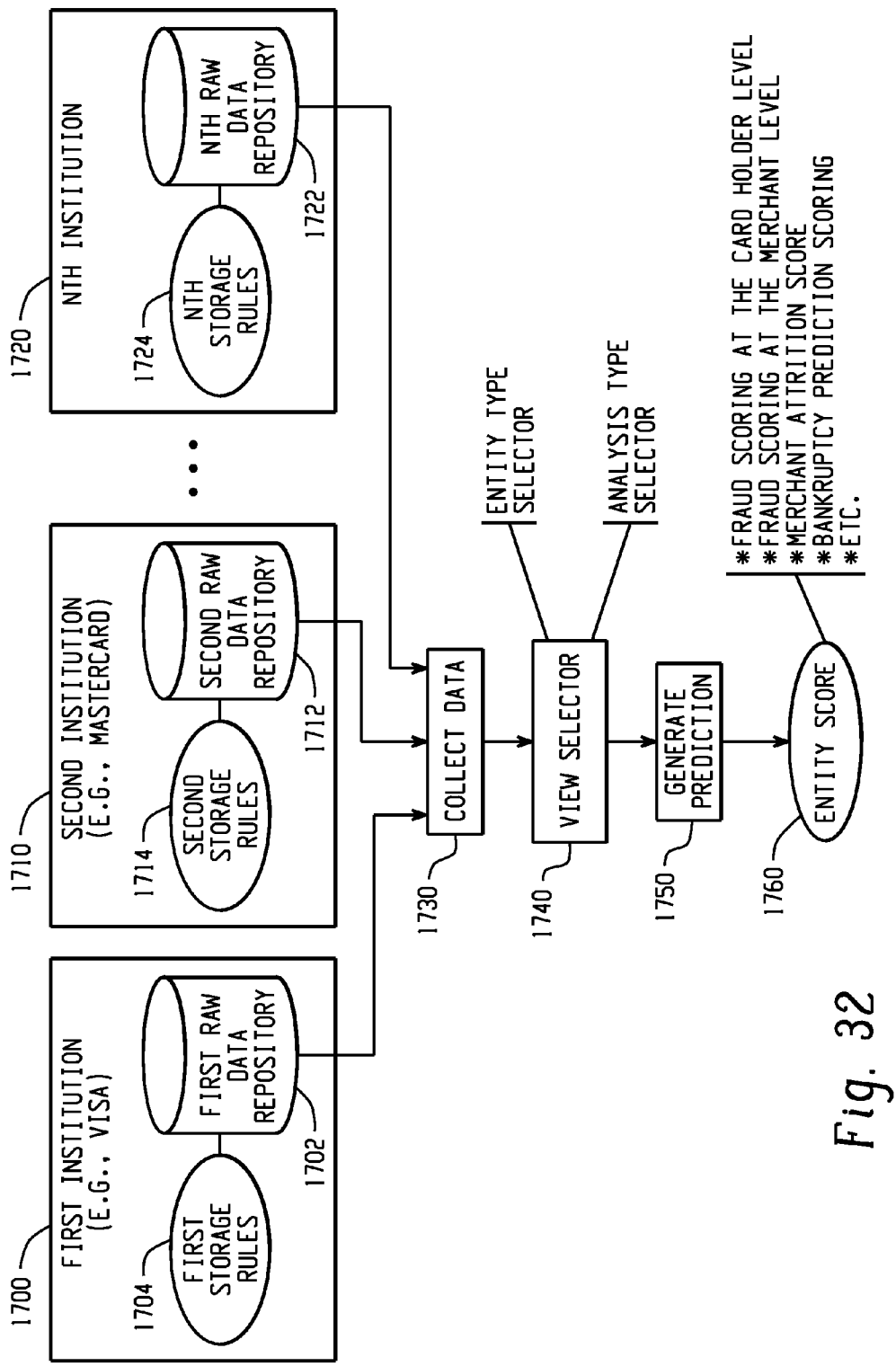

FIG. 32 depicts the storage of raw data (e.g., 1702, 1712, 1722) at or from different institutions (1700, 1710, 1720) which provides for an expanded, more comprehensive and quicker type of analysis to occur. Because each institution is not storing its information as a set of derived or calculated set of values that are typically application-specific, the raw data from each of these repositories can be retrieved and used together in order to provide a more robust predictive capability. As shown in FIG. 32, data is collected from the repositories (1702, 1712, 1722) at 1730. A view selector 1740 could be used as described above for selecting a particular entity type or analysis type for processing. Predictive model(s) at 1750 generate the predictions, such as an entity score 1760. Based upon the view selection, the score can be at multiple different levels (e.g., fraud scoring at the card holder level, fraud scoring at the merchant level, merchant attrition score, bankruptcy prediction scoring, etc.)

Even if the institutions utilized different storage rules (1704, 1714, 1724) (e.g., different time periods for the same data fields), the system can still utilize this data from the different institutions (1700, 1710, 1720) because raw data is being stored. This can be helpful if the raw data repositories are in a distributed environment, such as at different sites.

The repositories may be at different sites because of a number of reasons. A reason may be that an institution would like to have its repository at one of its locations; or different third-party analysis companies may have the repositories on behalf of their respective institutions. For example a third-party analysis company receives data from a first institution (e.g., a Visa institution) and applies its storage rules when storing information for the first institution while a different third-party analysis company receives data from a different institution (e.g., a MasterCard institution) and applies its storage rules when storing information for the other institution. Although different third-party analysis companies with their unique storage rules have stored the data from different institutions, the raw data from the different repositories can still be collected and used together in order to perform predictions.

As an illustration, if there is a significant increase in the amount of fraud detected at a merchant's location, than the raw data in the repository associated with that merchant can be retrieved from the repository in order to determine whether fraud can be detected for other credit card accounts that have purchased goods or services at that merchant's location. (Currently it takes a prolonged period of time for detecting whether a merchant is acting fraudulently with respect to credit cards that had been used at the merchant's location.) For example the fraud rate at the merchant's location could be 0.1% but now after evaluating other credit cards from different institutions that have been utilized at the merchant's location, the fraud rate is now 10%. By analyzing through the predictive model account activities that occur at the merchant's location, a more realistic score can be generated for the merchant.

Still further a merchant's fraud score can be used to determine whether a credit card has been compromised. Such processing can entail analyzing the raw data associated with the credit cards utilized at a merchant's location to generate a score for the merchant and then using that score to analyze an account whose credit card had recently been used at the merchant's location.

Figure 33:
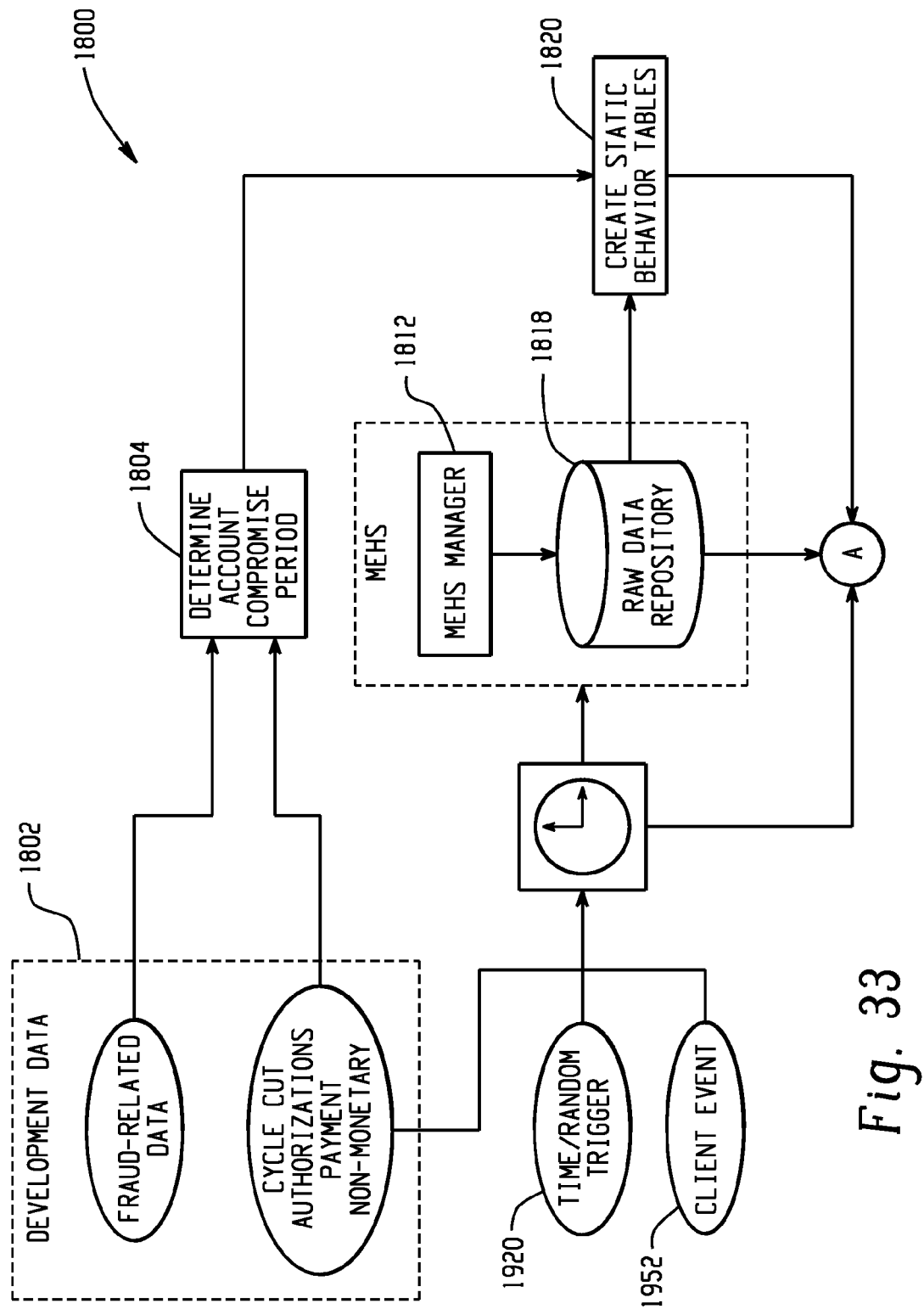
FIGS. 33 and 34 are block diagrams depicting an integrated system for fraud analysis.
Figure 34:
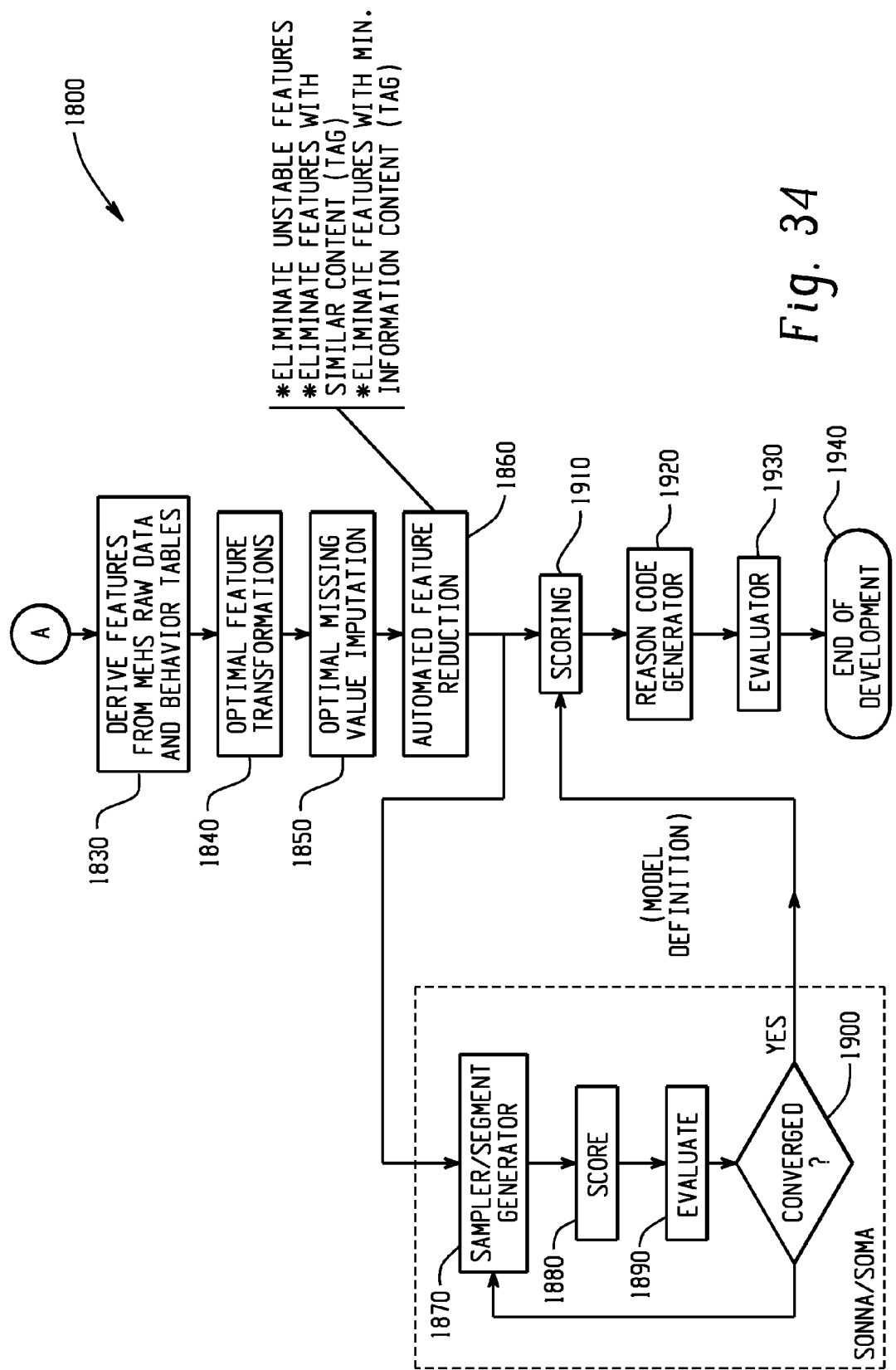

As another example of the wide scope of the systems and methods disclosed herein, FIGS. 33 and 34 show at 1800 a system that integrates different aspects disclosed herein. In the system of FIGS. 33 and 34, a predictive model is built using development data 1802. Development data 1802 (e.g., cycle cut data, authorizations data, payment data, non-monetary data, etc.) is used to help determine at 1804 an account compromise period that is at which point in time was the account in a compromised state up until the point in time when the account was actually blocked. After the account is blocked, the customer is issued a new card. The development data 1802 is stored in the raw data repository 1810 which has a manager 1812 that helps manage the raw data repository 1810, such as handling the updating of the raw data repository 1810 with new development data.

The raw data from the repository 1810 could also be utilized to create at 1820 static behavior tables. The data in the static behavior tables provides a global picture which is the same for a period of time (e.g., static or does not change dramatically over a period of time). These types of variables are useful in identifying the occurrence of fraud. An example of such variables include risk with respect to a geographical area. The information created for these tables do not have to be changed in production, whereas the transaction information in the repository do change once in production to reflect the transaction that is occurring while the system is in production.

Signature records are retrieved from the repository 1810 and features from the raw data are derived at. For example, a signature is an account-level compilation of historic data of all transaction types. Signatures help a model to recognize behavior change (e.g., to detect a trend and deviation from a trend). There is one record stored for each account. Length of history of each type of data may vary. Signature data is updated with every new transaction. The features are also derived based upon the behavior tables.

Because the retrieved data can comprise thousands of records the system analyzes the retrieved data in order to distill it down to a more manageable size by deriving features on-the-fly (in RAM) associated with the retrieved data.

For the optimal feature transformations process 1840, a standard prediction model transformation process as currently available can be used to reduce the amount of data that will be used as input to the predictive model. The optimal missing value imputation process 1850 fills in values that are missing from the retrieved data set. Missing values can occur because in practice the entity (e.g., a financial institution) supplying the raw data may not be able to provide all of the information regarding the transaction. As an illustration, one or more data items associated with a point-of-sale transaction might be missing. The missing value imputation process block determines the optimal missing value.

The automated feature reduction process 1860 eliminates unstable features as well as other items such as features with similar content and features with minimum information content. As an illustration, this process could eliminate such unstable features that, while they may be informative, change too dramatically between data sets. Features with similar content may also be eliminated because while they may be informative when viewed in isolation are providing duplicate information (e.g., highly collinear) and thus their removal from the input data set does not significantly diminish the amount of information contained in the input data set. Contrariwise the process preserves the features that provide the most amount of information. Accordingly, this process reduces the number of variables such that the more significant variables are used for training. The generated reduced feature data set is provided as input to the model generation process.

In the model generation process, a predictive model is trained with training data which in this example is the data provided by the automated feature reduction process 1860. In general, the predictive models are trained using error/cost measures. In this example, all accounts are scored using all networks during model building. Resulting errors are used by the generator process 1870 to intelligently rearrange the segments and retrain the models. In other words, the generator process 1870 determines whether the training data should be split and modeled by separate and distinct predictive models. This allows an automatic determination as to whether the entire training data set should be used or whether it is better to use subsets of the data for the training.

The trained one or more predictive models are scored at process 1880. The scores are then evaluated at process 1890. A test for convergence is performed at 1990. If there is convergence, then the model is considered defined (e.g., the parameters of the one or more predictive models are fixed). However if convergence has not occurred, then processing returns to the generator process block 1870 in order to determine how to split one or more data sets in order to train one or more new predictive models. For example the generator process 1870 determines which data subset(s) have been most problematic in being trained. A new predictive model is trained to focus only upon that problematic data set.

The result of the training process is that a complete predictive model has been defined (e.g., the parameters are fixed). The scoring operation that is performed at 1910 after the model definition is done for the purposes of the reason code generator 1920. The reason code generator 1920 uses the scores generated by the scoring process 1910. The reason code generator process 1920 examines the account scores and is configured to provide one or more reasons for why an account received a particular score. After reason codes have been generated, an evaluation 1930 is performed again for the account scores. At this point processing could loop back to process 1830 to derive features from raw data and the behavior tables; or after evaluation of the reason code generation process by the evaluation process, then the development phase of the predictive model can be deemed completed.

For the production phase, the generated model and reason codes can be used to score accounts and provide reasons for those scores. As shown at 1950 and 1952, the scoring process can be triggered by receipt of a new transaction or upon demand, such as based upon a random trigger. The trigger would signal that relevant records from the raw data repository 1810 should be retrieved and processed (e.g., missing value imputation processing, etc.). The resultant data would be the input to the trained model in order to generate scores and reason codes.

It is noted that the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented system for performing fraud detection, comprising:
one or more processors;
a computer-readable storage medium containing instructions operable to cause the one or more processors to perform operations, including:
storing a set of raw data in a raw data repository including unprocessed financial transaction data records resulting from one or more financial transactions, each unprocessed transaction data record having one or more associated data fields;
selecting a subset of the set of raw data, wherein a statistical analysis is performed on the subset of the set of raw data;
performing the same statistical analysis on the set of raw data in the raw data repository;
comparing the results of the statistical analysis on the set of raw data and the results of the statistical analysis on the subset of the set of raw data to determine whether the results satisfy a predetermined criteria, wherein when the results satisfy the predetermined criteria, a storage rule is generated, the storage rule indicating how many records of each data field associated with each unprocessed transaction data record are to be stored in the raw data repository, or a time period during which each data field associated with each unprocessed transaction data record is to be stored in the raw data repository; and
using a predictive model to perform fraud detection on the raw data stored according to the storage rule.

2. The system of claim 1, wherein the raw data includes authorization data, posting or settlement data, statement data, payment data, and non-monetary data that are to be used by the predictive model to perform fraud detection.

3. The system of claim 2, wherein the non-monetary data includes address change data, phone change data, mother name change data, or credit line change data.

4. The system of claim 1, wherein the raw data includes unprocessed data records as originally received from the locations where the financial transactions occurred.

5. The system of claim 1, wherein the raw data includes unaggregated and underived data records.

6. The system of claim 1, wherein the storage rule is stored in an IF-THEN-ELSE format.

7. The system of claim 1, wherein the storage rule indicates how many records of raw payment amounts should be stored.

8. The system of claim 1, wherein the raw data includes one or more data records, and wherein the storage rule indicates the number of records of each data field to store based upon type of transaction or number of fields associated with the one or more data records.

9. The system of claim 1, wherein the raw data includes one or more data records, and wherein the storage rule indicates a particular timeframe for determining how long a data record is to be stored in the raw data repository.

10. The system of claim 1, wherein the raw data includes one or more data records, wherein the one or more data records are stored in the raw data repository in variable lengths; and wherein the length of a data record is based upon a type of transaction with which the data record is associated.

11. The system of claim 1, wherein the records of each data field are stored in the raw data repository using a circular list for each data field.

12. The system of claim 1, wherein the raw data includes one or more data records, and wherein the one or more data records are at a transaction level or at an individual field level.

13. The system of claim 1, wherein the predictive model is a neural network predictive model that is configured to perform the fraud detection.

14. The system of claim 1, wherein the stored raw data includes one record per account or multiple records per account.

15. The system of claim 1, wherein the fraud detection is performed to determine whether fraud has occurred with respect to an entity; and wherein the entity is a financial transaction card, an individual, a merchant, or an account.

16. The system of claim 1, wherein the storage rule indicates that a different amount of raw data is to be stored for different types of entities.

17. The system of claim 1, wherein the stored raw data includes incremental transaction data, the system further comprising instructions operable to cause the one or more processors to perform operations, including:
generating a first score based upon the raw data regarding a new incremental transaction with respect to an entity;
receiving a trigger generated independent of the occurrence of the new incremental transaction; and
generating, in response to the generated trigger, a second score for the entity, the second score being based upon stored past incremental transaction data and upon non-incremental transaction data; wherein the generated second score is indicative of whether fraud has occurred or not; and wherein the second score is used to determine whether a fraud handling action is to be performed upon the entity.

18. The system of claim 1, wherein the raw data repository is configured for access by different types of financial analysis systems.

19. The system of claim 1, wherein the raw data repository is configured for access by a financial fraud detection system, a loan risk analysis system, and a revenue generation prediction system.

20. A computer-implemented method for performing fraud detection, comprising:
storing, using one or more processors, a set of raw data in a raw data repository including unprocessed financial transaction data records resulting from one or more financial transactions, each unprocessed financial transaction data record having one or more associated data fields;
selecting a subset of the set of raw data, wherein a statistical analysis is performed on the subset of the set of raw data;
performing the same statistical analysis on the set of raw data in the raw data repository;
comparing the results of the statistical analysis on the set of raw data and the results of the statistical analysis on the subset of the set of raw data to determine whether the results satisfy a predetermined criteria, wherein when the results satisfy the predetermined criteria, a storage rule is generated, the storage rule indicating how many records of each data field associated with each unprocessed transaction data record are to be stored in the raw data repository, or a time period during which each data field associated with each unprocessed transaction data record is to be stored in the raw data repository; and
using a predictive model to perform fraud detection on the raw data stored according to the storage rule.

21. A computer-readable storage medium encoded with instructions that cause a computer to perform a method for detecting fraud, said method comprising the steps of:
storing a set of raw data in a raw data repository including unprocessed financial transaction data records resulting from one or more financial transactions, each unprocessed financial transaction data record having one or more associated data fields;

selecting a subset of the set of raw data, wherein a statistical analysis is performed on the subset of the set of raw data;

performing the same statistical analysis on the set of raw data in the raw data repository;

comparing the results of the statistical analysis on the set of raw data and the results of the statistical analysis on the subset of the set of raw data to determine whether the results satisfy a predetermined criteria, wherein when the results satisfy the predetermined criteria, a storage rule is generated, the storage rule indicating how many records of each data field associated with each unprocessed transaction data record are to be stored in the raw data repository, or a time period during which each data field associated with each unprocessed transaction data record is to be stored in the raw data repository; and using a predictive model to perform fraud detection on the raw data stored according to the storage rule.

22. A computer-implemented system for performing fraud detection, comprising:

one or more processors;

a computer-readable storage medium containing instructions operable to cause the one or more processors to perform operations, including:

storing a set of raw data in a raw data repository including unprocessed financial transaction data records resulting from one or more financial transactions, each unprocessed transaction data record having two or more associated data fields;

selecting a subset of set of the raw data, wherein a statistical analysis is performed on the subset of the set of raw data;

performing the same statistical analysis on the set of raw data in the raw data repository;

comparing the results of the statistical analysis on the set of raw data and the results of the statistical analysis on the subset of the set of raw data to determine whether the results satisfy a predetermined criteria, wherein when the results satisfy the predetermined criteria, a storage rule is generated, the storage rule indicating how many records of each data field associated with each unprocessed transaction data record are to be stored in the raw data repository, wherein a first number of records of a first data field are stored, and wherein a second different number of records of a second data field are stored; and using a predictive model to perform fraud detection on the raw data stored according to the storage rule.

23. A computer-implemented system for performing fraud detection, comprising:

one or more processors;

a computer-readable storage medium containing instructions operable to cause the one or more processors to perform operations, including:

storing a set of raw data in a raw data repository including unprocessed financial transaction data records resulting from one or more financial transactions, each financial transaction being a particular type of transaction, each unprocessed transaction data record having one or more associated fields;

selecting a subset of set of the raw data, wherein a statistical analysis is performed on the subset of set of the raw data;

performing the same statistical analysis on the set of raw data in the raw data repository;

comparing the results of the statistical analysis on the set of raw data and the results of the statistical analysis on the subset of the set of raw data to determine whether the results satisfy a predetermined criteria, wherein when the results satisfy the predetermined criteria, a storage rule is generated, wherein the storage rule indicates the number of the financial transaction data records to store based upon type of transaction or number of fields associated with the one or more data records; and using a predictive model to perform fraud detection on the raw data stored according to the storage rule.

24. A computer-implemented system for performing fraud detection, comprising:

one or more processors;

a computer-readable storage medium containing instructions operable to cause the one or more processors to perform operations, including:

storing a set of raw data in a raw data repository including unprocessed financial transaction data records resulting from one or more financial transactions, each unprocessed transaction data record having one or more associated data fields;

selecting a subset of set of the raw data, wherein a statistical analysis is performed on the subset of the set of raw data;

performing the same statistical analysis on the set of raw data in the raw data repository;

comparing the results of the statistical analysis on the set of raw data and the results of the statistical analysis on the subset of the set of raw data, wherein when the comparison meets a predetermined criteria, a storage rule is generated, the storage rule indicating how many records of each data field associated with each unprocessed transaction data record are to be stored in the raw data repository and a particular timeframe for determining how long each unprocessed transaction data record is to be stored in the raw data repository; and using a predictive model to perform fraud detection on the raw data stored according to the storage rule.

25. The system of claim 1, wherein when comparing the results of the statistical analysis on the set of raw data and the results of the statistical analysis on the subset of the set of raw data, the results do not satisfy the predetermined criteria, then:

a second subset of the set of raw data is selected, a statistical analysis is performed on the second subset of the set of raw data, the results of the statistical analysis on the second subset of the set of raw data are compared to the results of the statistical analysis on the set of raw data, and a storage rule is generated when the comparison associated with the statistical analysis on the second subset of the set of raw data indicates that the results satisfy the predetermined criteria.

* * * * *